US012630151B2

(12) United States Patent
Lu et al.

(10) Patent No.: US 12,630,151 B2
(45) Date of Patent: May 19, 2026

(54) VEHICULAR VISION SYSTEM

(71) Applicant: MAGNA ELECTRONICS INC.,
Auburn Hills, MI (US)

(72) Inventors: Yuesheng Lu, Farmington Hills, MI
(US); Joel S. Gibson, Linden, MI (US);
Duane W. Gebauer, Gregory, MI (US);
Richard D. Shriner, Fenton, MI (US);
Patrick A. Miller, Grand Blanc, MI
(US)

(73) Assignee: Magna Electronics Inc., Auburn Hills,
MI (US)

( * ) Notice: Subject to any disclaimer, the term of this
patent is extended or adjusted under 35
U.S.C. 154(b) by 207 days.

(21) Appl. No.: 18/061,497

(22) Filed: Dec. 5, 2022

(65) Prior Publication Data

US 2023/0099248 A1      Mar. 30, 2023

Related U.S. Application Data

(60) Continuation of application No. 17/247,694, filed on
Dec. 21, 2020, now Pat. No. 11,518,377, which is a
(Continued)

(51) Int. Cl.
*B60W 30/09*          (2012.01)
*B62D 15/02*          (2006.01)
(Continued)

(52) U.S. Cl.
CPC ......... *B60W 30/09* (2013.01); *B62D 15/0295*
(2013.01); *G08G 1/168* (2013.01);
(Continued)

(58) Field of Classification Search
CPC ............ B60W 30/09; B60W 2420/403; B62D
15/0295; G08G 1/168; H04N 23/60;
(Continued)

(56) References Cited

U.S. PATENT DOCUMENTS 4,200,361 A      4/1980  Malvano et al.
4,214,266 A      7/1980  Myers
(Continued)

FOREIGN PATENT DOCUMENTS

EP          0426503 A1      5/1991
EP          0492591 A1      7/1992
(Continued)

OTHER PUBLICATIONS

G. Wang, D. Renshaw, P.B. Denyer and M. Lu, CMOS Video
Cameras, article, 1991, 4 pages, University of Edinburgh, UK.
(Continued)

*Primary Examiner* — Aaron L Troost
(74) *Attorney, Agent, or Firm* — HONIGMAN LLP

(57)          ABSTRACT

A vehicular vision system includes a rear backup camera and
a controller having an image processor. A video display
screen is disposed in the vehicle and viewable by a driver of
the vehicle. With the vehicular vision system operating in a
standard viewing mode, image data captured by the rear
backup camera is processed to provide video images repre-
sentative of a standard view rearward of the vehicle that is
within the field of view of the rear backup camera. With the
vehicular vision system operating in a cross-traffic viewing
mode, image data captured by the rear backup camera is
processed at the image processor to provide video images
derived from the processed captured image data that are
representative of a wider angle view rearward of the vehicle
that has a wider angle view than the standard view rearward
of the vehicle.

50 Claims, 10 Drawing Sheets

Related U.S. Application Data continuation of application No. 16/166,325, filed on Oct. 22, 2018, now Pat. No. 10,875,526, which is a continuation of application No. 15/349,011, filed on Nov. 11, 2016, now Pat. No. 10,106,155, which is a division of application No. 13/384,673, filed as application No. PCT/US2010/043363 on Jul. 27, 2010, now Pat. No. 9,495,876.

(60) Provisional application No. 61/228,659, filed on Jul. 27, 2009.

(51) Int. Cl.

| | |
|---|---|
| *G08G 1/16* | (2006.01) |
| *G09G 5/14* | (2006.01) |
| *H04N 23/60* | (2023.01) |
| *H04N 23/63* | (2023.01) |
| *H04N 25/61* | (2023.01) |

(52) U.S. Cl.
CPC ............. *H04N 23/60* (2023.01); *H04N 23/63* (2023.01); *H04N 25/61* (2023.01); *B60R 2300/105* (2013.01); *B60R 2300/305* (2013.01); *B60R 2300/806* (2013.01); *B60W 2420/403* (2013.01); *G09G 5/14* (2013.01); *G09G 2340/125* (2013.01); *G09G 2380/10* (2013.01)

(58) Field of Classification Search
CPC .. H04N 23/63; H04N 25/61; B60R 2300/105; B60R 2300/305; B60R 2300/806; B60R 2300/808; G09G 5/14; G09G 2340/125; G09G 2380/10
See application file for complete search history.

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai et al. |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer et al. |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger et al. |
| 4,580,875 A | 4/1986 | Bechtel et al. |
| 4,600,913 A | 7/1986 | Caine |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,647,161 A | 3/1987 | Muller |
| 4,653,316 A | 3/1987 | Fukuhara |
| 4,669,825 A | 6/1987 | Itoh et al. |
| 4,669,826 A | 6/1987 | Itoh et al. |
| 4,671,615 A | 6/1987 | Fukada et al. |
| 4,672,457 A | 6/1987 | Hyatt |
| 4,676,601 A | 6/1987 | Itoh et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith et al. |
| 4,731,669 A | 3/1988 | Hayashi et al. |
| 4,741,603 A | 5/1988 | Miyagi et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan et al. |
| 4,817,948 A | 4/1989 | Simonelli |
| 4,820,933 A | 4/1989 | Hong et al. |
| 4,825,232 A | 4/1989 | Howdle |
| 4,838,650 A | 6/1989 | Stewart et al. |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |

(56)                    References Cited

U.S. PATENT DOCUMENTS

| 5,208,701 A | 5/1993 | Maeda |
| 5,245,422 A | 9/1993 | Borcherts et al. |
| 5,253,109 A | 10/1993 | O'Farrell et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |

(56) References Cited

U.S. PATENT DOCUMENTS

| | | | |
|---|---|---|---|
| 6,294,989 | B1 | 9/2001 | Schofield et al. |
| 6,297,781 | B1 | 10/2001 | Turnbull et al. |
| 6,302,545 | B1 | 10/2001 | Schofield et al. |
| 6,310,611 | B1 | 10/2001 | Caldwell |
| 6,313,454 | B1 | 11/2001 | Bos et al. |
| 6,317,057 | B1 | 11/2001 | Lee |
| 6,320,176 | B1 | 11/2001 | Schofield et al. |
| 6,320,282 | B1 | 11/2001 | Caldwell |
| 6,326,613 | B1 | 12/2001 | Heslin et al. |
| 6,329,925 | B1 | 12/2001 | Skiver et al. |
| 6,333,759 | B1 | 12/2001 | Mazzilli |
| 6,341,523 | B2 | 1/2002 | Lynam |
| 6,353,392 | B1 | 3/2002 | Schofield et al. |
| 6,366,213 | B2 | 4/2002 | DeLine et al. |
| 6,370,329 | B1 | 4/2002 | Teuchert |
| 6,396,397 | B1 | 5/2002 | Bos et al. |
| 6,411,204 | B1 | 6/2002 | Bloomfield et al. |
| 6,411,328 | B1 | 6/2002 | Franke et al. |
| 6,420,975 | B1 | 7/2002 | DeLine et al. |
| 6,424,273 | B1 | 7/2002 | Gutta et al. |
| 6,428,172 | B1 | 8/2002 | Hutzel et al. |
| 6,430,303 | B1 | 8/2002 | Naoi et al. |
| 6,433,676 | B2 | 8/2002 | DeLine et al. |
| 6,433,817 | B1 | 8/2002 | Guerra |
| 6,442,465 | B2 | 8/2002 | Breed et al. |
| 6,477,464 | B2 | 11/2002 | McCarthy et al. |
| 6,485,155 | B1 | 11/2002 | Duroux et al. |
| 6,497,503 | B1 | 12/2002 | Dassanayake et al. |
| 6,498,620 | B2 | 12/2002 | Schofield et al. |
| 6,513,252 | B1 | 2/2003 | Schierbeek et al. |
| 6,516,664 | B2 | 2/2003 | Lynam |
| 6,523,964 | B2 | 2/2003 | Schofield et al. |
| 6,534,884 | B2 | 3/2003 | Marcus et al. |
| 6,539,306 | B2 | 3/2003 | Turnbull |
| 6,547,133 | B1 | 4/2003 | Devries, Jr. et al. |
| 6,553,130 | B1 | 4/2003 | Lemelson et al. |
| 6,559,435 | B2 | 5/2003 | Schofield et al. |
| 6,559,761 | B1 | 5/2003 | Miller et al. |
| 6,574,033 | B1 | 6/2003 | Chui et al. |
| 6,578,017 | B1 | 6/2003 | Ebersole et al. |
| 6,587,573 | B1 | 7/2003 | Stam et al. |
| 6,589,625 | B1 | 7/2003 | Kothari et al. |
| 6,593,565 | B2 | 7/2003 | Heslin et al. |
| 6,594,583 | B2 | 7/2003 | Ogura et al. |
| 6,611,202 | B2 | 8/2003 | Schofield et al. |
| 6,611,610 | B1 | 8/2003 | Stam et al. |
| 6,627,918 | B2 | 9/2003 | Getz et al. |
| 6,631,994 | B2 | 10/2003 | Suzuki et al. |
| 6,636,258 | B2 | 10/2003 | Strumolo |
| 6,648,477 | B2 | 11/2003 | Hutzel et al. |
| 6,650,233 | B2 | 11/2003 | DeLine et al. |
| 6,650,455 | B2 | 11/2003 | Miles |
| 6,672,731 | B2 | 1/2004 | Schnell et al. |
| 6,674,562 | B1 | 1/2004 | Miles |
| 6,678,056 | B2 | 1/2004 | Downs |
| 6,678,614 | B2 | 1/2004 | McCarthy et al. |
| 6,680,792 | B2 | 1/2004 | Miles |
| 6,690,268 | B2 | 2/2004 | Schofield et al. |
| 6,700,605 | B1 | 3/2004 | Toyoda et al. |
| 6,703,925 | B2 | 3/2004 | Steffel |
| 6,704,621 | B1 | 3/2004 | Stein et al. |
| 6,710,908 | B2 | 3/2004 | Miles et al. |
| 6,711,474 | B1 | 3/2004 | Treyz et al. |
| 6,714,331 | B2 | 3/2004 | Lewis et al. |
| 6,717,610 | B1 | 4/2004 | Bos et al. |
| 6,721,659 | B2 | 4/2004 | Stopczynski |
| 6,735,506 | B2 | 5/2004 | Breed et al. |
| 6,741,377 | B2 | 5/2004 | Miles |
| 6,744,353 | B2 | 6/2004 | Sjonell |
| 6,757,109 | B2 | 6/2004 | Bos |
| 6,762,867 | B2 | 7/2004 | Lippert et al. |
| 6,794,119 | B2 | 9/2004 | Miles |
| 6,795,221 | B1 | 9/2004 | Urey |
| 6,802,617 | B2 | 10/2004 | Schofield et al. |
| 6,806,452 | B2 | 10/2004 | Bos et al. |
| 6,822,563 | B2 | 11/2004 | Bos et al. |
| 6,823,241 | B2 | 11/2004 | Shirato et al. |
| 6,824,281 | B2 | 11/2004 | Schofield et al. |
| 6,831,261 | B2 | 12/2004 | Schofield et al. |
| 6,847,487 | B2 | 1/2005 | Burgner |
| 6,882,287 | B2 | 4/2005 | Schofield |
| 6,889,161 | B2 | 5/2005 | Winner et al. |
| 6,891,563 | B2 | 5/2005 | Schofield et al. |
| 6,909,753 | B2 | 6/2005 | Meehan et al. |
| 6,946,978 | B2 | 9/2005 | Schofield |
| 6,953,253 | B2 | 10/2005 | Schofield et al. |
| 6,968,736 | B2 | 11/2005 | Lynam |
| 6,975,775 | B2 | 12/2005 | Rykowski et al. |
| 7,004,593 | B2 | 2/2006 | Weller et al. |
| 7,004,606 | B2 | 2/2006 | Schofield |
| 7,005,974 | B2 | 2/2006 | McMahon et al. |
| 7,038,577 | B2 | 5/2006 | Pawlicki et al. |
| 7,046,448 | B2 | 5/2006 | Burgner |
| 7,062,300 | B1 | 6/2006 | Kim |
| 7,065,432 | B2 | 6/2006 | Moisel et al. |
| 7,085,637 | B2 | 8/2006 | Breed et al. |
| 7,092,548 | B2 | 8/2006 | Laumeyer et al. |
| 7,116,246 | B2 | 10/2006 | Winter et al. |
| 7,123,168 | B2 | 10/2006 | Schofield |
| 7,133,661 | B2 | 11/2006 | Hatae et al. |
| 7,149,613 | B2 | 12/2006 | Stam et al. |
| 7,158,015 | B2 | 1/2007 | Rao et al. |
| 7,167,796 | B2 | 1/2007 | Taylor et al. |
| 7,195,381 | B2 | 3/2007 | Lynam et al. |
| 7,202,776 | B2 | 4/2007 | Breed |
| 7,224,324 | B2 | 5/2007 | Quist et al. |
| 7,227,459 | B2 | 6/2007 | Bos et al. |
| 7,227,611 | B2 | 6/2007 | Hull et al. |
| 7,249,860 | B2 | 7/2007 | Kulas et al. |
| 7,253,723 | B2 | 8/2007 | Lindahl et al. |
| 7,255,451 | B2 | 8/2007 | McCabe et al. |
| 7,311,406 | B2 | 12/2007 | Schofield et al. |
| 7,325,934 | B2 | 2/2008 | Schofield et al. |
| 7,325,935 | B2 | 2/2008 | Schofield et al. |
| 7,338,177 | B2 | 3/2008 | Lynam |
| 7,339,149 | B1 | 3/2008 | Schofield et al. |
| 7,344,261 | B2 | 3/2008 | Schofield et al. |
| 7,360,932 | B2 | 4/2008 | Uken et al. |
| 7,370,983 | B2 | 5/2008 | DeWind et al. |
| 7,375,803 | B1 | 5/2008 | Bamji |
| 7,380,948 | B2 | 6/2008 | Schofield et al. |
| 7,388,182 | B2 | 6/2008 | Schofield et al. |
| 7,402,786 | B2 | 7/2008 | Schofield et al. |
| 7,423,248 | B2 | 9/2008 | Schofield et al. |
| 7,423,821 | B2 | 9/2008 | Bechtel et al. |
| 7,425,076 | B2 | 9/2008 | Schofield et al. |
| 7,459,664 | B2 | 12/2008 | Schofield et al. |
| 7,483,058 | B1 | 1/2009 | Frank et al. |
| 7,526,103 | B2 | 4/2009 | Schofield et al. |
| 7,541,743 | B2 | 6/2009 | Salmeen et al. |
| 7,561,181 | B2 | 7/2009 | Schofield et al. |
| 7,565,006 | B2 | 7/2009 | Stam et al. |
| 7,616,781 | B2 | 11/2009 | Schofield et al. |
| 7,619,508 | B2 | 11/2009 | Lynam et al. |
| 7,633,383 | B2 | 12/2009 | Dunsmoir et al. |
| 7,639,149 | B2 | 12/2009 | Katoh |
| 7,676,087 | B2 | 3/2010 | Dhua et al. |
| 7,690,737 | B2 | 4/2010 | Lu |
| 7,720,580 | B2 | 5/2010 | Higgins-Luthman |
| 7,792,329 | B2 | 9/2010 | Schofield et al. |
| 7,843,451 | B2 | 11/2010 | Lafon |
| 7,855,778 | B2 | 12/2010 | Yung et al. |
| 7,859,565 | B2 | 12/2010 | Schofield et al. |
| 7,881,496 | B2 | 2/2011 | Camilleri et al. |
| 7,914,187 | B2 | 3/2011 | Higgins-Luthman et al. |
| 7,930,160 | B1 | 4/2011 | Hosagrahara et al. |
| 8,017,898 | B2 | 9/2011 | Lu et al. |
| 8,094,170 | B2 | 1/2012 | Kato et al. |
| 8,095,310 | B2 | 1/2012 | Taylor et al. |
| 8,098,142 | B2 | 1/2012 | Schofield et al. |
| 8,138,899 | B2 | 3/2012 | Ghneim |
| 8,224,031 | B2 | 7/2012 | Saito |
| 9,495,876 | B2 | 11/2016 | Lu et al. |
| 10,106,155 | B2 | 10/2018 | Lu et al. |

(56)                    References Cited

U.S. PATENT DOCUMENTS

| | | | |
|---|---|---|---|
| 10,875,526 | B2 | 12/2020 | Lu et al. |
| 11,518,377 | B2 | 12/2022 | Lu et al. |
| 2001/0001563 | A1 | 5/2001 | Tomaszewski |
| 2002/0003571 | A1* | 1/2002 | Schofield ............... B60K 35/28 |
| | | | 348/148 |
| 2002/0113873 | A1 | 8/2002 | Williams |
| 2003/0021490 | A1 | 1/2003 | Okamoto et al. |
| 2003/0137586 | A1 | 7/2003 | Lewellen |
| 2003/0222982 | A1 | 12/2003 | Hamdan et al. |
| 2004/0008410 | A1 | 1/2004 | Stam et al. |
| 2005/0219852 | A1 | 10/2005 | Stam et al. |
| 2005/0236894 | A1* | 10/2005 | Lu ........................... B62D 11/08 |
| | | | 303/139 |
| 2005/0237385 | A1 | 10/2005 | Kosaka et al. |
| 2005/0273212 | A1* | 12/2005 | Hougen .................... G06T 7/70 |
| | | | 701/1 |
| 2006/0018511 | A1 | 1/2006 | Stam et al. |
| 2006/0018512 | A1 | 1/2006 | Stam et al. |
| 2006/0050018 | A1 | 3/2006 | Hutzel et al. |
| 2006/0091813 | A1 | 5/2006 | Stam et al. |
| 2006/0103727 | A1 | 5/2006 | Tseng |
| 2006/0202984 | A1* | 9/2006 | Yang ........................ G06T 5/80 |
| | | | 345/419 |
| 2006/0250501 | A1 | 11/2006 | Wildmann et al. |
| 2007/0088474 | A1 | 4/2007 | Sugiura et al. |
| 2007/0104476 | A1 | 5/2007 | Yasutomi et al. |
| 2007/0109406 | A1 | 5/2007 | Schofield et al. |
| 2007/0120657 | A1 | 5/2007 | Schofield et al. |
| 2007/0154068 | A1 | 7/2007 | Stein et al. |
| 2007/0242339 | A1 | 10/2007 | Bradley |
| 2008/0147321 | A1 | 6/2008 | Howard et al. |
| 2008/0180526 | A1 | 7/2008 | Trevino |
| 2008/0192132 | A1 | 8/2008 | Bechtel et al. |
| 2008/0231701 | A1 | 9/2008 | Greenwood et al. |
| 2009/0079828 | A1* | 3/2009 | Lee ........................... B60R 1/28 |
| | | | 348/148 |
| 2009/0113509 | A1 | 4/2009 | Tseng et al. |
| 2009/0135253 | A1* | 5/2009 | Augst ..................... H04N 23/63 |
| | | | 348/148 |
| 2009/0143967 | A1 | 6/2009 | Lee et al. |
| 2009/0160987 | A1 | 6/2009 | Bechtel et al. |
| 2009/0190015 | A1 | 7/2009 | Bechtel et al. |
| 2009/0236825 | A1 | 9/2009 | Okuda et al. |
| 2009/0256938 | A1 | 10/2009 | Bechtel et al. |
| 2010/0014770 | A1 | 1/2010 | Huggett et al. |
| 2010/0085170 | A1 | 4/2010 | Oleg |
| 2010/0110189 | A1 | 5/2010 | Kuboyama et al. |
| 2010/0118169 | A1 | 5/2010 | Yu et al. |
| 2010/0253597 | A1 | 10/2010 | Seder et al. |
| 2010/0324770 | A1 | 12/2010 | Ramsey et al. |
| 2011/0001614 | A1* | 1/2011 | Ghneim ................... B60D 1/36 |
| | | | 382/103 |
| 2011/0001615 | A1* | 1/2011 | Kuoch ................... G01S 13/862 |
| | | | 382/104 |
| 2012/0045112 | A1 | 2/2012 | Lundblad et al. |
| 2012/0140080 | A1* | 6/2012 | Taylor ................... H04N 23/90 |
| | | | 348/148 |

FOREIGN PATENT DOCUMENTS

| | | | |
|---|---|---|---|
| EP | 0788947 | A1 | 8/1997 |
| JP | 59114139 | | 7/1984 |
| JP | 6080953 | | 5/1985 |
| JP | 6079889 | | 10/1986 |
| JP | 6272245 | | 5/1987 |
| JP | 6414700 | | 1/1989 |
| JP | 4114587 | B2 | 4/1992 |
| JP | 0577657 | | 3/1993 |
| JP | 05050883 | | 3/1993 |
| JP | 5213113 | | 8/1993 |
| JP | 6227318 | B2 | 8/1994 |
| JP | 06267304 | | 9/1994 |
| JP | 06276524 | | 9/1994 |
| JP | 06295601 | | 10/1994 |
| JP | 07004170 | | 1/1995 |
| JP | 0732936 | | 2/1995 |
| JP | 0747878 | | 2/1995 |
| JP | 07052706 | | 2/1995 |
| JP | 0769125 | | 3/1995 |
| JP | 07105496 | | 4/1995 |
| JP | 2630604 | | 7/1997 |
| JP | 200383742 | A | 3/2003 |
| WO | 2009/004907 | A1 | 1/2009 |
| WO | 2009036176 | A1 | 3/2009 |

OTHER PUBLICATIONS

Tokimaru et al., "CMOS Rear-View TV System with CCD Camera", National Technical Report vol. 34, No. 3, pp. 329-336, Jun. 1988 (Japan).

Reexamination Control No. U.S. Appl. No. 90/007,519, Reexamination of U.S. Pat. No. 6,222,447, issued to Schofield et al.

Reexamination Control No. U.S. Appl. No. 90/007,520, Reexamination of U.S. Pat. No. 5,949,331, issued to Schofield et al.

Reexamination Control No. U.S. Appl. No. 90/011,478, Reexamination of U.S. Pat. No. 6,222,447, issued to Schofield et al.

Reexamination Control No. U.S. Appl. No. 90/011,477, Reexamination of U.S. Pat. No. 5,949,331, issued to Schofield et al.

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al. (Eds), "Intelligent Vehicle Tecnologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Pratt, "Digital Image Processing, Passage—ED.3", John Wiley & Sons, US, Jan. 1, 2001, pp. 657-659, XP002529771.

International Search Report and Written Opinion for corresponding PCT Application No. PCT/US2010/043363.

* cited by examiner

| Frequency (Hz) | Power Spectrum Density (m/s$^2$)$^2$/Hz |
|---|---|
| 10 | 20 |
| 55 | 6.5 |
| 180 | 0.25 |
| 300 | 0.25 |
| 360 | 0.14 |
| 1000 | 0.14 |

No Distortion
Correction

34

Optical
Correction

34

Electronic
Correction

34

VEHICULAR VISION SYSTEM

CROSS REFERENCE TO RELATED APPLICATIONS

The present application is a continuation of U.S. patent application Ser. No. 17/247,694, filed Dec. 21, 2020, now U.S. Pat. No. 11,518,377, which is a continuation of U.S. patent application Ser. No. 16/166,325, filed Oct. 22, 2018, now U.S. Pat. No. 10,875,526, which is a continuation of U.S. patent application Ser. No. 15/349,011, filed Nov. 11, 2016, now U.S. Pat. No. 10,106,155, which is a divisional application of U.S. patent application Ser. No. 13/384,673, filed Jun. 27, 2012, now U.S. Pat. No. 9,495,876, which is a 371 national phase filing of PCT Application No. PCT/US2010/043363, filed Jul. 27, 2010, which claims the filing benefit of U.S. provisional application Ser. No. 61/228,659, filed Jul. 27, 2009, which are hereby incorporated herein by reference in their entireties.

FIELD OF THE INVENTION

The present invention relates to a camera for use in vehicles, and more particularly rearview cameras for use in vehicles.

BACKGROUND OF THE INVENTION

A typical camera for mounting on a vehicle has a lens member, an imaging element, a circuit board and housing members that connect together. The typical vehicular camera, however, is relatively restricted in terms of its processing capabilities.

SUMMARY OF THE INVENTION

In one aspect of the invention, a vehicular camera is provided, comprising a lens, a housing, an imager and a microcontroller that is capable of handling certain functions, such as applying overlays to images received by the imager, dewarping the image and/or providing different viewing modes.

In a first aspect, the invention is directed to a vehicular camera, comprising a lens, a housing, an imager and a microcontroller that is capable of handling certain functions, such as controlling the application of overlays to images received by the imager, dewarping the image and/or providing different viewing modes.

In a second aspect, the invention is directed to vehicles and/or vehicular systems that incorporate the aforementioned camera. Such systems include, for example, vehicle surround view systems and object detection/collision avoidance systems.

In a third aspect, the invention is directed to a vehicular camera, comprising a lens, an image processor and a microcontroller. The microcontroller is connected to the image processor by a first bus through which command data is communicated to the image processor from the microcontroller. The command data includes application instructions to draw application data from a selected point in the flash memory. The microcontroller is connected to the image processor by a second bus through which application data is communicated to the image processor from the flash memory.

In a fourth aspect, the invention is directed to a vehicular camera that dewarps an image by stretching and compressing portions of the image so as to provide a selected shape to a selected known element in the raw image received by the camera. For example, the camera may be configured to dewarp images based on the shape of the horizon line in the images. In the raw images received by the camera the horizon line may be curved instead of being straight as it should be if there were no warpage in the raw images. The camera will stretch and compress portions of the image in order to at least partially straighten out the horizon line thereby dewarping the image.

In a particular embodiment, the camera includes a lens having a field of view, an image sensor, a housing and a controller. The lens and image sensor are mounted to the housing at a selected position relative to each other. The imager receives raw images from the lens. For at least one raw image the controller is programmed to generate a dewarped image by stretching and compressing portions of the raw image so as to provide in the dewarped image a selected shape for a selected known element in the field of view of the lens.

In a fifth aspect, the invention is directed to a camera system for a vehicle, including a camera, a distance sensor, and a controller that determines whether there is an element in the fields of view of the camera and the distance sensor that represents a collision risk for the vehicle based on an image from the camera and input from the distance sensor. Upon detection of an element that represents a collision risk the controller is programmed to carry out at least one action consisting of: informing the driver of the vehicle of the collision risk; and control at least one vehicle component to inhibit a collision by the vehicle with the element that represents a collision risk.

In a sixth aspect, the invention is directed to a camera system for a vehicle, including a plurality of cameras each of which is connected to a central controller by an electrical cable. Each camera has sufficient individual processing capacity to be able to modify raw images and generate processed images. The processed images are sent to the central controller, which combines the images into a single image which shows the combined field of view of the plurality of cameras, and which may optionally apply an overlay to the single image. Because each camera has sufficient processing capacity to modify the raw images, a relatively inexpensive type of electrical cable can be used to transmit the images from the cameras to the central controller. By contrast, in some prior art systems, the cameras are not capable of modifying the images and so typically expensive, well-insulated cable (e.g., coaxial cable) is used to transmit images from the camera to a central controller, which receives the images and carries out functions, such as dewarping functions, on the images. The coaxial cables, however, are relatively expensive, and are difficult to route easily through the vehicle due to their thickness and consequent low flexibility.

In a particular embodiment, the camera system includes four cameras. The cameras are positioned at selected positions about the vehicle such that the combined field of view of the four cameras is substantially 360 degrees. Each camera includes a lens, an image sensor, a housing and a controller. The lens and image sensor are mounted to the housing at a selected position relative to each other. The image sensor receives raw images from the lens. The controller is programmed to modify at least one raw image to produce a processed image. The central controller is programmed to combine the processed images from the cameras into a single combined image showing the combined field of view.

In a seventh aspect, the invention is directed to a camera for a vehicle having a towing device, including a lens having a field of view, an image sensor, a housing and a controller that processes raw images received by the image sensor into processed images. The camera is positioned at an actual viewing angle and has the towing device is in the field of view of the lens. The camera has a bird's eye viewing mode in which the controller is programmed to modify the raw image so that the processed image appears to have been taken at an apparent viewing angle that is more vertically oriented than the actual viewing angle.

In an eighth aspect, the invention is directed to a camera for a vehicle. The camera is programmed to recognize a selected feature in its field of view and to apply an overlay proximate the selected feature in an initial raw image showing the selected feature. As the vehicle moves, and the selected feature moves in the field of view of the camera, the camera holds the overlay in a fixed position, so that the selected feature moves relative to the overlay. This can be used for several purposes. One purpose in particular is to assist the vehicle driver in backing up the vehicle when towing a trailer. The selected feature would be provided on the trailer (e.g., a sign with a cross-hairs on it). Initially, when the driver has the trailer directly behind the vehicle, the camera could be activated by the driver to apply an overlay to the raw image showing the cross-hairs. The overlay could be, for example, a dot at the center of the cross-hairs. As the driver backs up the vehicle and trailer, the cross-hairs on the trailer will move relative to the fixed dot on the screen if the trailer begins to turn at an angle relative to the vehicle. Thus, the driver can use the dot and the cross-hairs as a reference to keep the vehicle and the trailer straight while backing up.

BRIEF DESCRIPTION OF THE DRAWINGS

The present invention will now be described by way of example only with reference to the attached drawings, in which.

DETAILED DESCRIPTION OF THE INVENTION

Figures 1, 1A:
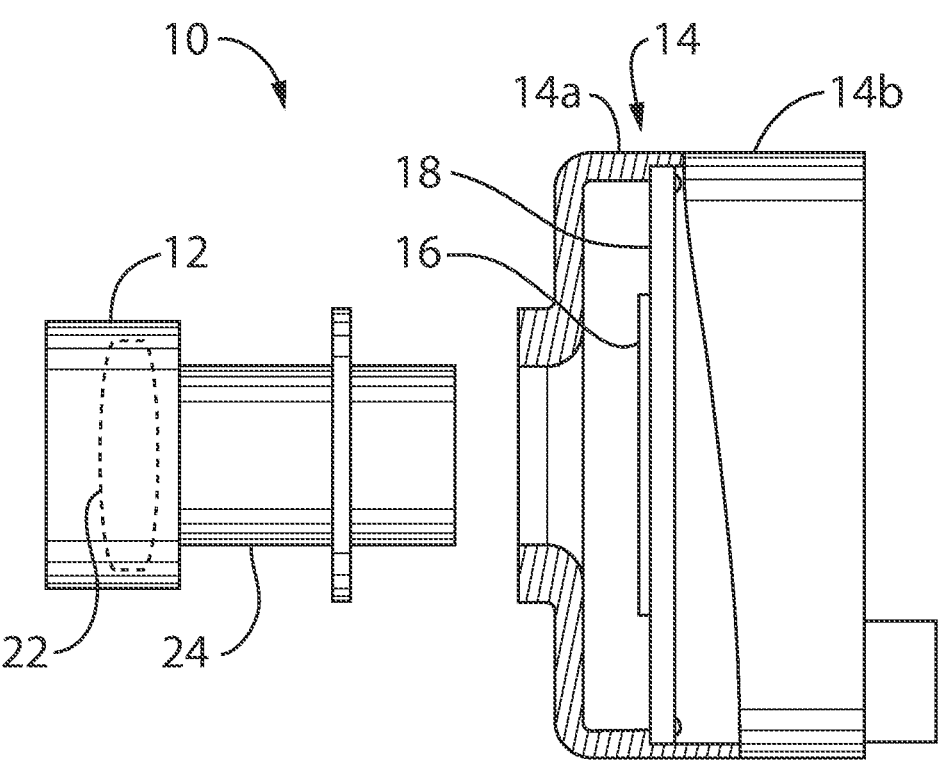
FIG. 1 is a schematic illustration of a camera in accordance with an embodiment of the present invention.
FIG. 1A is a schematic of a camera in accordance with an embodiment of the present invention, illustrating electrical components associated with the camera.

FIG. 1A is a system block diagram of a camera system 100 which includes an image processor 102 operatively connected to a camera lens 103 (as discussed in greater detail below) and a microcontroller 104. In the preferred embodiment the image processor 102 is a model MT9V126 which includes a CMOS image sensor and some control elements and is available from Aptina Imaging, San Jose, CA, and the microcontroller 104 is a PIC microcontroller available from Microchip Technology, Chandler, AZ, and which includes an internal flash memory 110. The image processor 102 and microcontroller 104 communicate via a serial, two wire, inter-integrated circuit ($I^2C$) bus 106, as known in the art per se. The image processor 102 and microcontroller 104 also communicate via a four wire serial peripheral interface (SPI) bus 108, as known in the art per se. The system 100 also includes a transceiver 112 that enables the microcontroller 104 to communicate with other devices over the vehicle internal bus 114 such as a CAN or LIN bus as known in the art per se. The image processor 102 provides a composite video output 116, such as a single ended or differential NTSC or PAL signal.

In an embodiment not shown in FIG. 1A, the image processor SPI bus is used to connect to an external flash memory device that stores overlay data to be superimposed on the images obtained from the camera lens 103. In the embodiment shown in FIG. 1A, the SPI bus 108 is directly connected to the microcontroller 104, which includes I/O pins (not shown) and appropriate interface circuitry for implementing the SPI bus protocol, all under control of the microcontroller. The SPI protocol provides for the reading or writing to a block of memory, commencing from a memory address. Thus, the microcontroller 104 is able to emulate a flash device, providing data from its internal flash 110, or dynamically calculating and providing imager data such as overlay data to the internal SPI bus registers for transfer to the image processor 102. Thus, overlay data can be dynamically calculated on the fly. This provides an advantage over the prior art where conventionally, the overlay data had to be pre-programmed or pre-considered to account for all eventualities. For example, in an application which superimposes a square block at any point in the image to represent a moving object, the prior art required that the flash memory be pre-programmed with a series of blocks that covered the entire display area, to thus mimic the movement of the block. This can be avoided by dynamic overlay data generation by the microcontroller 104. For example, the microcontroller 104 may be programmed to calculate at least one of the size and shape of an overlay, to store the calculated shape of the overlay in its flash memory 110 and to transmit data relating to the overlay to the image processor 102 for the image processor 102 to apply to one or more images.

The I2C bus 106 is used by the microcontroller 104 to send command data to the image processor 102, including for example memory instructions for where to draw application data including for example, overlay data. The SPI bus 108 is used to communicate the application data between the microcontroller 104 and the image processor (specifically between the flash memory 110 contained on the microcontroller 104 and the image processor 102).

The implementation of the emulated flash provides a convenient method for the camera system 100 to access imager-specific data, including custom image settings, overlays, and digital correction algorithms. The imager-specific data is organized into a series of records, including custom register settings sets, digital correction algorithms, overlays, and imager patches. Each record is organized into tables indexed by a table of contents. Each table is in turn indexed by a master table of contents. Furthermore, initialization tables are made available for custom initialization routines.

Thus, other advantages flowing from the invention includes the fact that flash drivers do not need to be developed to support an external device. Rather, the microcontroller has a means for performing flash-based operations on program memory. The bootloader also has reduced complexity as the microcontroller does not need to maintain a separate flash driver for an external flash. There are also a reduced number of physical connections/communication channels. With emulated flash, a single SPI communication channel exists between the microcontroller and image processor. With an external flash, an additional SPI connection between the microcontroller and external flash would be required, in order to allow for re-flashing.

Reference is made to FIG. 1, which shows a camera 10 in accordance with an embodiment of the present invention. The camera includes a lens assembly 12, a housing 14, which may include a lens holder 14a and a rear housing member 14b, an imager 16 and a microcontroller 18.

The lens assembly 12 is an assembly that includes a lens 22 and a lens barrel 24. The lens 22 may be held in the lens barrel 24 in any suitable way. The lens 22 preferably includes optical distortion correction features and is tailored to some extent for use as a rearview camera for a vehicle. The distance between the top of the lens 22 and the plane of the imager is preferably about 25 mm.

The lens barrel 24 may have either a threaded exterior wall or a threadless exterior wall. In embodiments wherein the exterior wall is threaded, the thread may be an M12×0.5 type thread. The barrel 24 is preferably made from Aluminum or plastic, however other materials of construction are also possible. The lens barrel 24 preferably has a glue flange thereon.

A lens retainer cap, if provided, preferably has a diameter of about 20 mm. The imager 16 is preferably a ¼ inch CMOS sensor with 640×480 pixels, with a pixel size of 5.6 micrometers×5.6 micrometers. The imager preferably has an active sensor area of 3.584 mm horizontal×2.688 mm vertical, which gives a diagonal length of 4.480 mm.

The field of view of the camera 10 may be about 123.4 degrees horizontally×about 100.0 degrees vertically, which gives a diagonal field of view of about 145.5 degrees. It will be understood that other fields of view are possible, and are described further below.

The F number of the lens is preferably about 2.0 or lower.

The relative illumination is preferably >about 50% inside an image circle having a diameter of about 4.480 mm.

The geometrical distortion is preferably better than about −47.

The modulation transfer function (MTF) values for both tangential MTF and sagittal MTF are preferably greater than about 0.45 at 45 lp/mm on the lens axis, and greater than or equal to about 0.30 at 45 lp/mm off the camera axis between about 0 degrees and about 60 degrees. Exemplary curves for the MTF value at 0 degrees and at 60 degrees are shown in FIGS. 2a and 2b.

The lens 22 preferably has an integrated infrared cutoff filter. The filter can be directly coated on one of the lens elements. Alternatively, the filter can be an add-on thin glass element with the coating thereon. The pass-band wavelengths of the infrared cutoff filter may be about 410 nm for a low pass, and about 690 nm for a high pass.

The infrared cutoff filter preferably has at least about 85% transmission over the pass-band spectrum, and at least about 50% transmission at both 410 nm and 690 nm.

The lens 22 preferably has an anti-reflective coating on each surface of each lens element, except the surface with the infrared cutoff filter thereon and except any surfaces that are cemented to the lens barrel or to some other component.

The image circle diameter of the lens is preferably less than 4.80 mm. The angle between the optical axis of the lens 22 and the reference diameter axis for the barrel 24 is preferably less than 1.0 degrees.

Preferably, the lens 22 is substantially free from artificial optical effects, such as halo, veiling glare, lens flare and ghost images.

Preferably, the lens 22 has a hydrophobic coating on its outer surfaces, for repelling water and for providing a self-cleaning capability to the lens 22.

Preferably, the lens 22 is capable of withstanding the following conditions without any detrimental effects, such as peel-off, cracking, crazing, voids, bubbles of lens elements, dust/water/fluid ingress, moisture condensation, foreign objects, cropping of field, non-uniform image field and distortion that did not exist prior to the conditions, or any visible and irreversible change to the appearance of the lens 22 including color and surface smooth level, or any of the aforementioned lens properties changing outside a selected range.

Figures 2, 3:
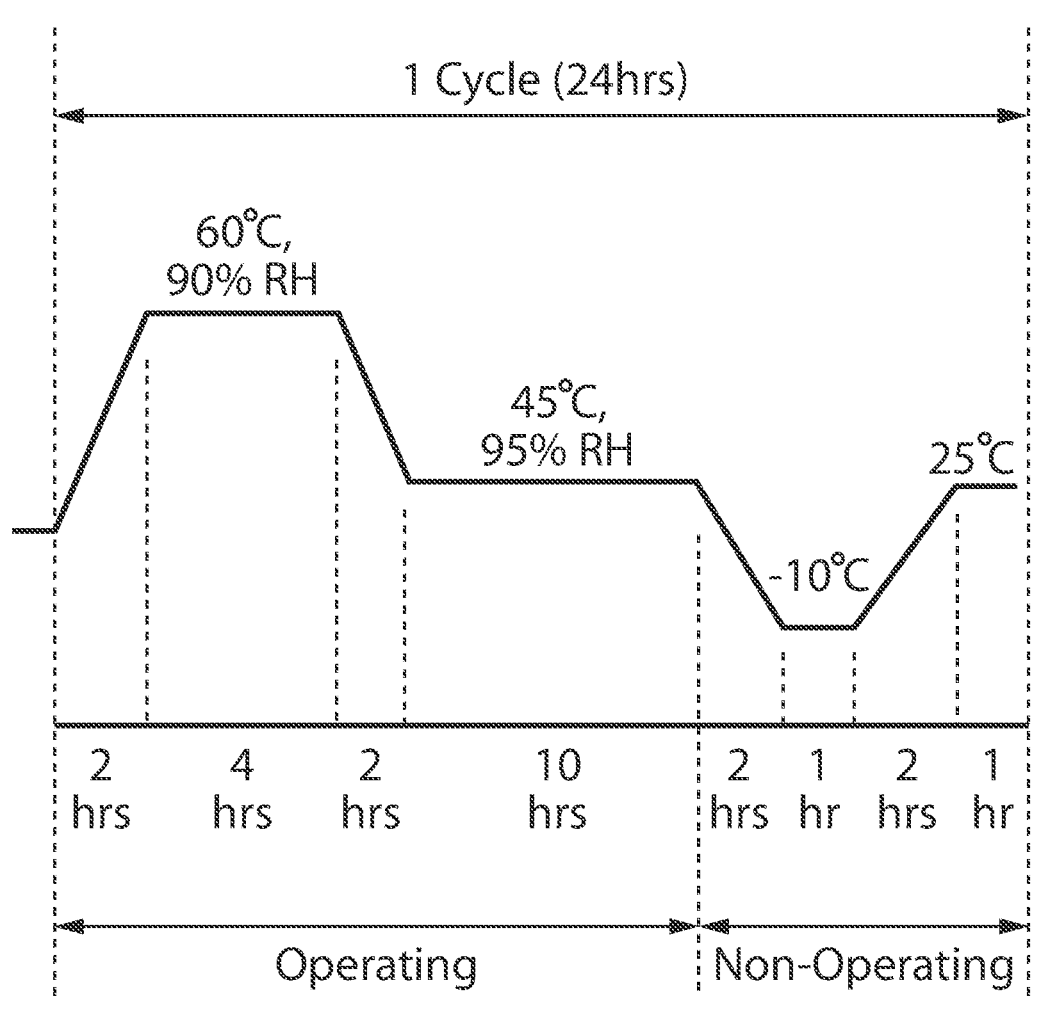
FIG. 2 is a graph showing temperature-related specifications for the camera shown in FIG. 1.
FIG. 3 is a table showing fatigue-related specifications for the camera shown in FIG. 1.
Figure 4:
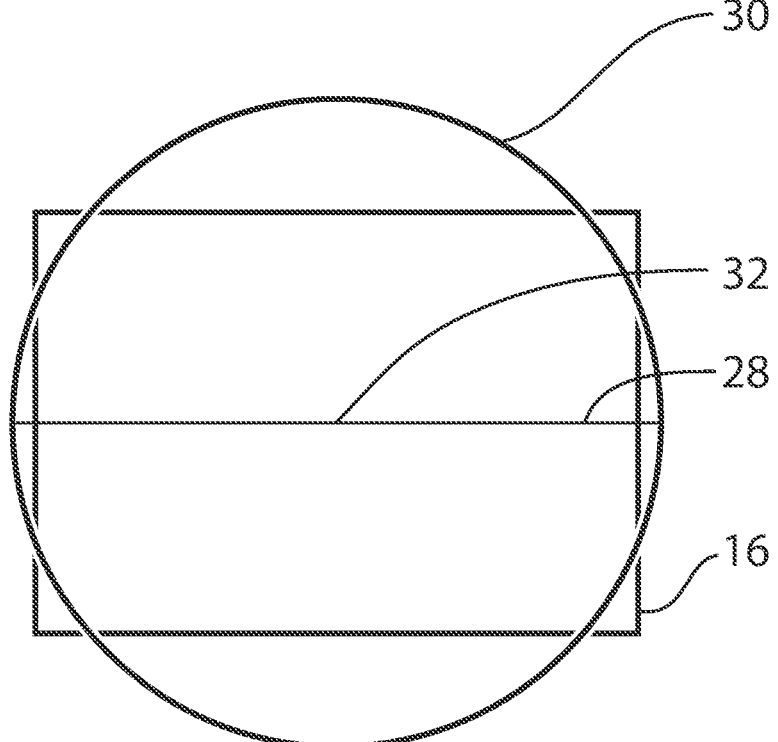
FIG. 4 is a view of the lens superimposed with the imager for the camera shown in FIG. 1.

The conditions to be withstood by the lens 22 include:

Subjecting the lens 22 to a temperature of anywhere from −40 degrees Celsius to 95 degrees Celsius;

Enduring 1000 hours at 95 degrees Celsius;

Cycling of the lens a selected number of times between −40 and 95 degrees Celsius, with a dwell time for the lens in each temperature of at least a selected period of time and a ramping time to reach one or the other temperature of less than another selected period of time;

Exposing the lens 22 to 85 degrees Celsius and 85% relative humidity for 1200 hours;

Subjecting the lens 22 to 10 cycles of the test profile shown in FIG. 2, including a first set of 5 cycles that include exposing the lens 22 to the portion of the cycle wherein the temperature drops to −10 degrees, and then a second set of 5 cycles wherein that portion of the cycle is replaced by ramping the lens 22 from 45 degrees Celsius to 25 degrees Celsius;

Dropping a lens with a front cover thereon from a selected height, such as 1 m, onto a concrete or steel surface;

Running the lens 22 under 6 shock pulses with 100 g and 10 ms half-sine pulses, one in each opposite direction of 3 perpendicular axes;

Exposing the lens 22 to a vibration test for 27 hours in the X-axis, 27 hours in the Y-axis and 81 hours in the Z-axis, with a RMS acceleration value of 27.8 m/s² according to the power spectrum density/frequency table shown in FIG. 3;

Exposing the lens 22 to the following test procedure relating to abrasion resistance: Prepare 1000 ml of sludge in which 100 g of Kanto loam (JIS Z 8901 class 8) is dissolved. Soak a sponge in the sludge and scrub the lens surface with the sponge for 250 repetitions, applying 20N of pressing force while scrubbing.

Exposing the lens 22 to heavy splash shower, car wash spray mist and dust, with the condition that any moisture condensation in the lens assembly 12 dissipates within 10 minutes;

Exposure to water without leakage therepast in accordance with ISO standard 20653;

Meeting IP Code 7 and 6K requirements;

Heating the lens 22 to 85 degrees Celsius for 1 hour, spraying the upper body of the lens 22 with 1200 psi water stream for 2 minutes at a 0 degree angle, a 90 degree angle and at a 45 degree angle relative to the lens axis, respectively;

Soaking the lens in water at 95 degrees Celsius for 1 hour and then immediately dunk the upper body of the lens 22 in room temperature water at a depth of 15 cm for 30 minutes;

Meeting ISO Standard 20653 with respect to dust requirement, and meeting IP Code 6K for protection against foreign objects. For the testing a vertical flow chamber is preferably used, with a dust density of $2 \text{ kg/m}^3$ for 8 hours continuous circulation.

Exposing the upper part of the lens to 5% salt water at 35 degrees Celsius for 96 hours;

Testing that the front glass surface of the lens 22 and the upper exterior body of the lens 22 resist the following chemicals: Automatic transmission fluid, hypoid lubricant, hydraulic fluid, power steering fluid, differential lubricant, central hydraulic fluid, engine oil, engine wax protective, engine coolant/Ethylene Glycol, gasoline, diesel fuel, kerosene, bio-diesel/Methanol based fuel, brake fluid, windshield washer fluid, window glass cleaner, car wash cleaner/soap solution, car wax and silicone protectants, leather wax, battery acid—dilute sulfuric acid (density: $1.285 \text{ g/cm}^3$), and $CaCl_2$);

For each chemical tested, the test is preferably conducted for 24 hours of exposure. The test is conducted in accordance with the following procedure:

1. Place test sample in a temperature chamber maintained at 40° C. on a test fixture representative of in-vehicle position with any protective surrounding structures.

2. Keep test sample at 40° C. for one hour. Remove sample from the chamber and apply 100 ml of test chemical/ fluid by either spraying or pouring to front glass surface and upper exterior body. Store the sample at outside ambient temperature (RT) for 1 hour.

3. Replace the sample in the chamber and keep it at 40° C. for one hour.

Then ramp up the chamber temperature to 70° C. (60° C. for battery acid) within 30 minutes and keep the sample at that temperature for 4 hours (dwell time). Ramp down the chamber temperature to 40° C. within 30 minutes.

4. Repeat step B and C for the same fluid but prolong dwell time from 4 hours to 12 hours at high temperature.

5. Repeat step B, C and D for the next fluid in the set. Continue the process up to a maximum of four fluids per sample.

Exposing the lens to a test procedure laid out in IEC 60068-2-60 method 4, whereby the lens 22 is exposed to H2S in a gas concentration of 10 ppb, $SO_2$ in a gas concentration of 200 ppb, Chlorine in a gas concentration of 10 ppb and $NO_2$ in a gas concentration of 200 ppb;

Subjecting the lens 22 to UV exposure test as referenced to SAE J1960v002, with a minimum exposure level is 2500

$KJ/m^2$. There must be no significant change of color and gloss level or other visible detrimental surface deterioration in any part of the lens upper body. The lens upper body includes and is not limited to lens cap surface, the subsurface under the first glass element, top glass and its surface coating. There is preferably no crack, crazing, bubbles or any defect or particles appear after UV exposure in and on any of the glass or plastic lens elements and its coatings.

The lens cap is preferably black and free of ding, dig, crack, bur, scratch, or other visible defects. There must be no visible color variation on a lens cap and among lenses.

The coating of the first glass is preferably free of dig, scratch, peeling, crack, bubble or flaking. The color appearance of the AR coating should have no or minimum visible color variation among lenses.

The interior of the lens 22 (at the mating surfaces of the constituent lens elements) preferably has little or no moisture inside it, which can cause water spots on the inside surfaces of the lens 22 after cycles of condensation and subsequent evaporation, and which can leak out from the lens 22 into portions of the camera 10 containing electrical components thereby causing problems with those electrical components. Preferably, the lens 22 is manufactured in a controlled, low-humidity environment. Other optional steps that can be taken during lens manufacture include: drying the interior surfaces of the lens 22, and vacuum packing the lens for transportation.

Figures 5A, 5B, 5C:
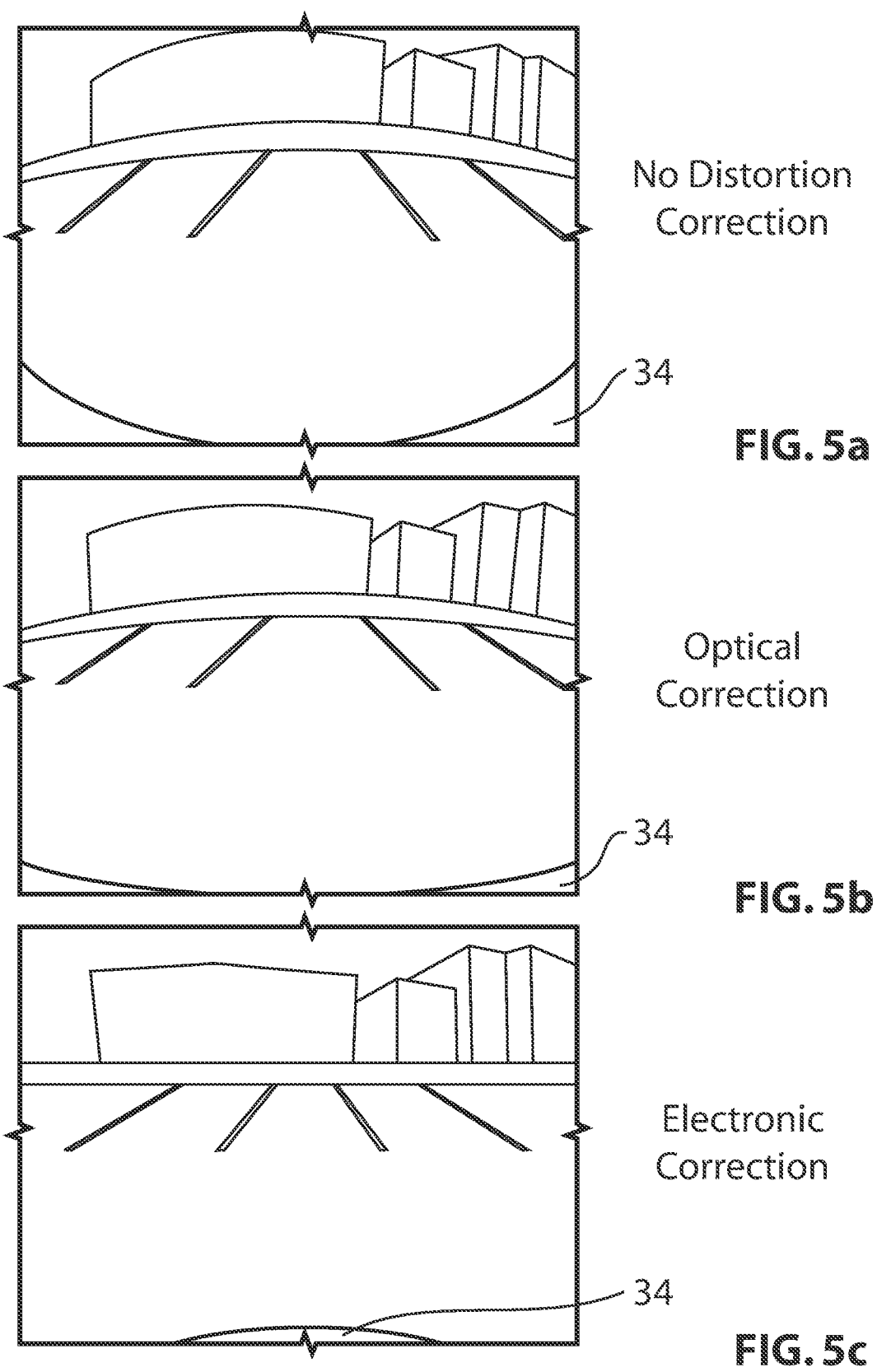
FIGS. 5a, 5b and 5c are images taken using the camera shown in FIG. 1 with different amounts of distortion correction.

The manufacture of the lens 22 using a plurality of lens elements that are joined together can optically correct for distortion that can otherwise occur. Such optical distortion correction is advantageous particularly for a lens with a field of view that approaches 180 degrees horizontally, but is also advantageous for a lens 22 with a lesser field of view, such as a 135 degree field of view. An example of the effects of optical distortion correction is shown in FIG. 5b. The multiple lens elements that are provided in the lens each have selected optical properties, (e.g., refractive index), and are shaped in a selected way to optically dewarp the image produced by the lens, as compared to a single element, spherical lens.

Aside from optical distortion correction, the camera 10 preferably also provides other forms of distortion correction. To carry this out, selected techniques may be employed. For example, one technique is to position the lens 22 so that the horizon line (shown at 28) in the field of view (shown at 30) lies near the optical axis of the lens 22 (shown at 32). As a result, there will be less distortion in the horizon line in the image sent from the camera 10 to the in-vehicle display. Aside from positioning the lens 22 so that the horizon line is closer to the optical axis of the lens 22, the microcontroller 18 preferably processes the image to straighten the horizon line digitally (i.e., by compressing and/or stretching selected vertically extending portions of the image). In some embodiments, the amount of distortion in the image will increase proportionally with horizontal distance from the optical axis. Thus, the amount of compression or stretching of vertically extending strips of the image will vary depending on the horizontal position of the strip. The portions of the image to stretch or compress and the amounts by which to compress them can be determined empirically by testing an example of the camera so as to determine the amount of distortion present in vertically extending portions (i.e., vertical strips) of the image that contain image elements that have a known shape. For example, the horizon line should appear as a straight horizontal line in camera images. Thus when testing the camera, values can be manually calculated for use to compress or stretch vertically extending portions (e.g., strips) above and below the horizon line so that the horizon line appears straight in the image. These values can then be used in production versions of the camera that will have the same lens and the same orientation relative to the horizon line. As an alternative instead of manually calculating the compression and stretch values to apply to vertical strips of the image, the microcontroller 18 may be programmed to carry out a horizon line detection routine, taking into account that the horizon line is vertically close to the optical axis in the center region of the image to assist the routine in finding the horizon line. It will be understood that other selected known elements could be positioned proximate the optical axis and used instead of the horizon line.

The microcontroller 18 (FIG. 1) is preferably further programmed to stretch or compress other selected portions of the image so that other selected, known image elements in the image appear closer to how they would appear if the image was not distorted. For example, the microcontroller 18 may carry out an edge detection routine to determine where the edge of the bumper appears in the image. Alternatively, testing can be carried out on the camera to manually determine where the bumper is in the image. Once the edge of the bumper is located either manually or by use of an edge detection routine, values can be determined to use to compress or stretch vertically extending portions (i.e., strips) above and below the edge of the bumper to adjust the position of the edge of the bumper so that it more closely matches a selected shape (i.e., so that it more closely matches the shape it should have if the image were not distorted). It will be understood that the 'selected shape' of the bumper edge may be a horizontal line if the bumper has a rear edge that is straight. However, the selected shape may be a curve since many vehicle bumpers have rear edges that are curved.

Aside from reducing the amount of warping in the portions of the image containing the bumper and the horizon line, the microcontroller 18 can also modify the image in a way to make vertical elements of the image appear approximately vertical. These digital distortion correction steps can take place in a selected order. For example, the first step can be to straighten the vehicle bumper. A second step can be to straighten the horizon line. A third step can be to straighten vertical objects.

In embodiments or applications wherein other artifacts are always in the image received by the camera 10, these artifacts may be used to determine the image modification that can be carried out by the microcontroller 18 to at least straighten out portions of the image that show the artifacts.

As shown in FIG. 5c, the combination of digital distortion correction and optical distortion correction reduces the amount of overall distortion in the image sent by the camera to an in-vehicle display.

In addition to the distortion correction, the microcontroller 18 is preferably capable of providing a plurality of different image types. For example, the microcontroller 18 can provide a standard viewing mode which gives an approximately 135 degree field of view horizontally, a 'cross-traffic' viewing mode which gives an approximately 180 degree field of view horizontally, and a bird's eye viewing mode, which gives a view that appears to be from a camera that is spaced from the vehicle and is aimed directly downwards. The standard viewing mode (with optical and digital distortion correction) is shown in FIG. 5c.

Figures 6, 7:
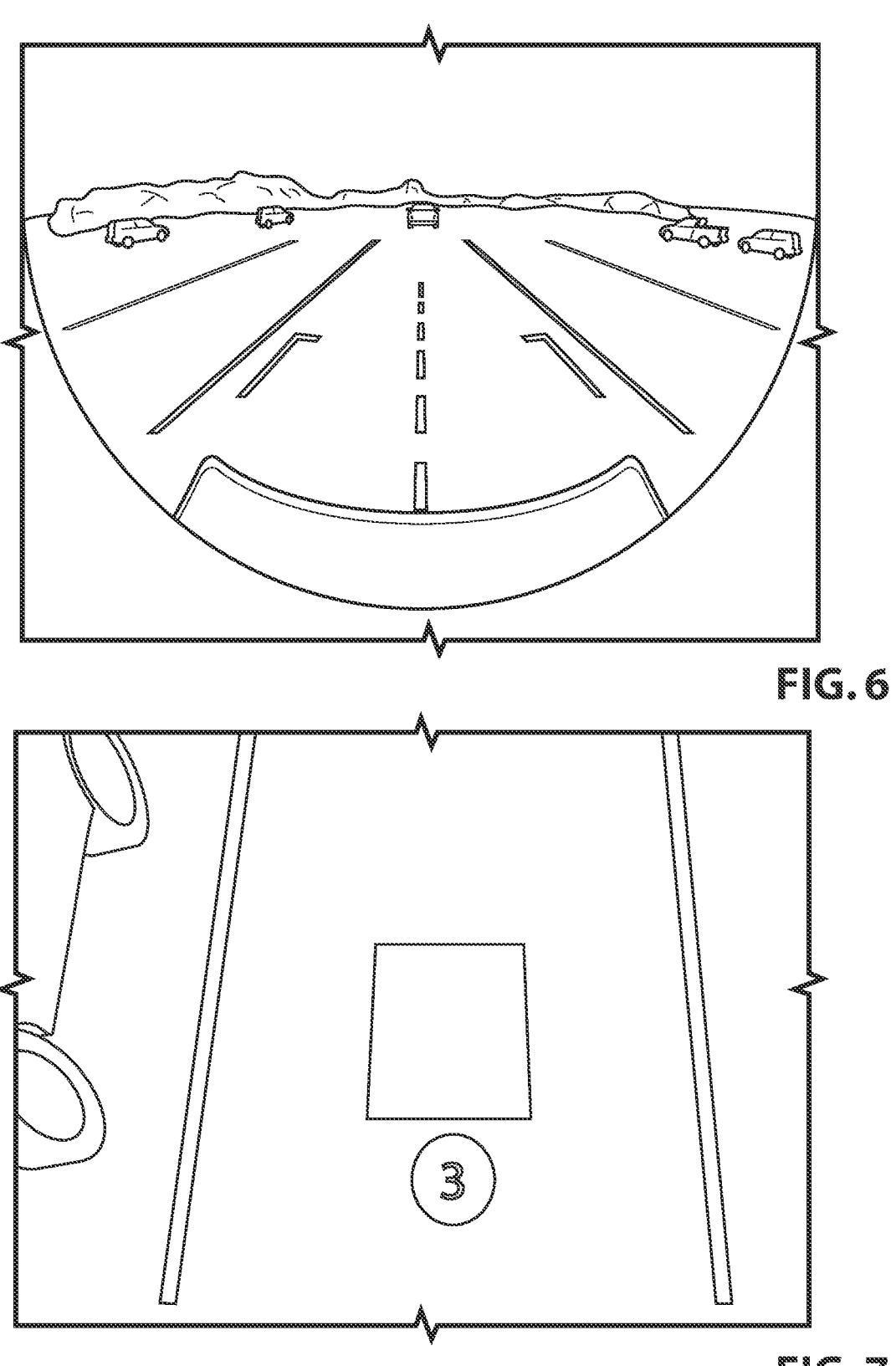
FIG. 6 is an image from the camera shown in FIG. 1, when in a cross-traffic viewing mode.
FIG. 7 is an image from the camera shown in FIG. 1, when in a bird's eye viewing mode.

The cross-traffic viewing mode is shown in FIG. 6. The cross-traffic viewing mode provides a view of the regions behind to the left and behind to the right of the vehicle, so that a driver can determine, for example, whether it is safe to back out of a parking spot in a parking lot. The cross-traffic view provides the driver with an approximately 180 degree view. This permits the driver to see to the left of the vehicle, to the right of the vehicle and directly behind the vehicle all at once. The digital dewarping (i.e., the digital distortion correction) that is carried out by the microcontroller 18 (FIG. 1) for the cross-traffic view is different than the digital dewarping that is carried out for the standard view.

It will be understood that, in order to provide the cross-traffic viewing mode, the lens 22 (FIG. 1) is constructed to have a field of view of approximately 180 degrees horizontally (i.e., it is a 180 degree lens). That same lens 22 is also used when the camera provides the standard viewing mode with the 135 degree field of view. Accordingly, the standard viewing mode involves cropping portions of the image taken by the 180 degree lens 22.

While a 180 degree lens 22 is preferable for the camera 10, it is alternatively possible for the lens 22 to be a 135 degree lens. In such a case, the camera 10 would not provide a cross-traffic viewing mode.

The bird's eye viewing mode (FIG. 7) can be provided by compressing selected portions of the image and expanding other portions of it, thereby moving the apparent viewpoint of the camera 10.

The bird's eye viewing mode can be used, for example, to assist the driver when backing up the vehicle to connect it to a trailer hitch. The bird's eye viewing mode provides a view that appears to come from a viewpoint that is approximately directly above the tow ball on the vehicle. This viewing mode is discussed further below.

Figures 8, 9:
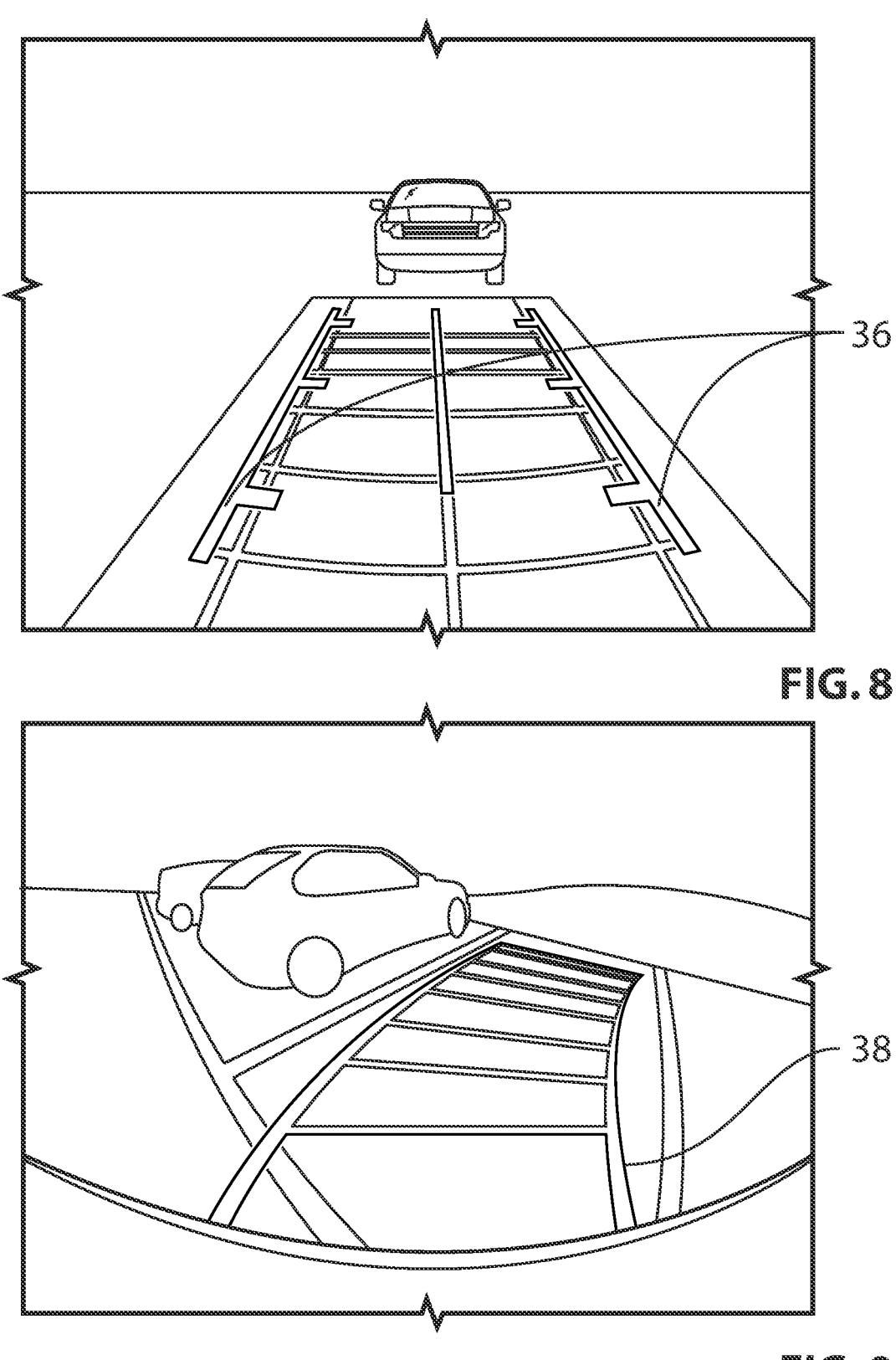
FIG. 8 is an image from the camera shown in FIG. 1, showing a static overlay applied to the image.
FIG. 9 is an image from the camera shown in FIG. 1, showing a dynamic overlay applied to the image.

In addition to providing a plurality of viewing modes, the camera 10 is preferably capable of providing graphical overlays on the images prior to the images being sent from the camera 10 to an in-vehicle display. Preferably, the camera 10 can provide both static overlays and dynamic overlays. Static overlays are overlays that remain constant in shape, size and position on the image. An example of a static overlay is shown at 36 in FIG. 8. The static overlay 36 shown in FIG. 8 provides information regarding the width of the vehicle and rough distance information behind the vehicle.

Many different types of dynamic overlay can be provided for many different functions. A first example of a dynamic overlay is shown at 38 in FIG. 9. The dynamic overlay 38 shows the vehicle's projected path based on the current steering wheel angle of the vehicle. It will be noted that the overlay 38 may have a selected degree of transparency, so that the image behind it shows through and is thus not completely obscured.

Figures 10, 11:
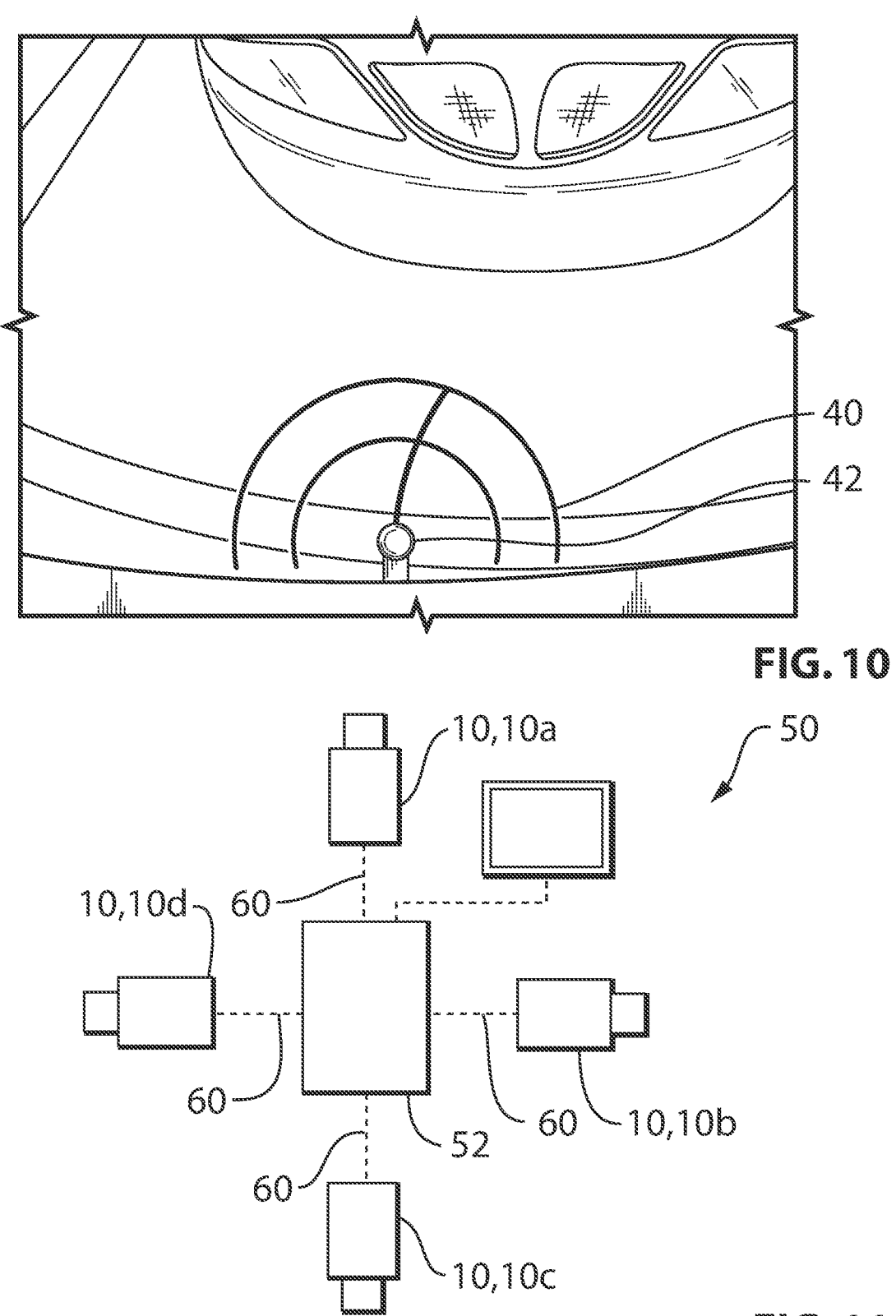
FIG. 10 is an image from the camera shown in FIG. 1, when the camera is in a hitch mode, showing a dynamic overlay applied to the image.
FIG. 11 is a schematic illustration of a vehicle surround view system that uses a plurality of the cameras shown in FIG. 1.

Another example of a dynamic overlay is shown at 40 in FIG. 10. The overlay 40 shows the projected path of the tow ball of the vehicle based on the vehicle's current steering angle. This overlay 40 gives the driver useful information when backing the vehicle up to align the tow ball shown at 42 with a hitch (not shown). It will be noted that the camera 10 is operating in a hitch viewing mode to provide the image shown in FIG. 10. The hitch viewing mode incorporates the bird's eye viewing mode, along with a digital zoom function that provides the driver with a magnified view of the tow ball 42 and its immediate surroundings. This view, combined with the overlay 40 gives the driver detailed information so that the driver can align the tow ball 42 with a hitch relatively precisely. It will be understood that the tow ball could alternatively be any other type of towing device.

Figures 12, 13:
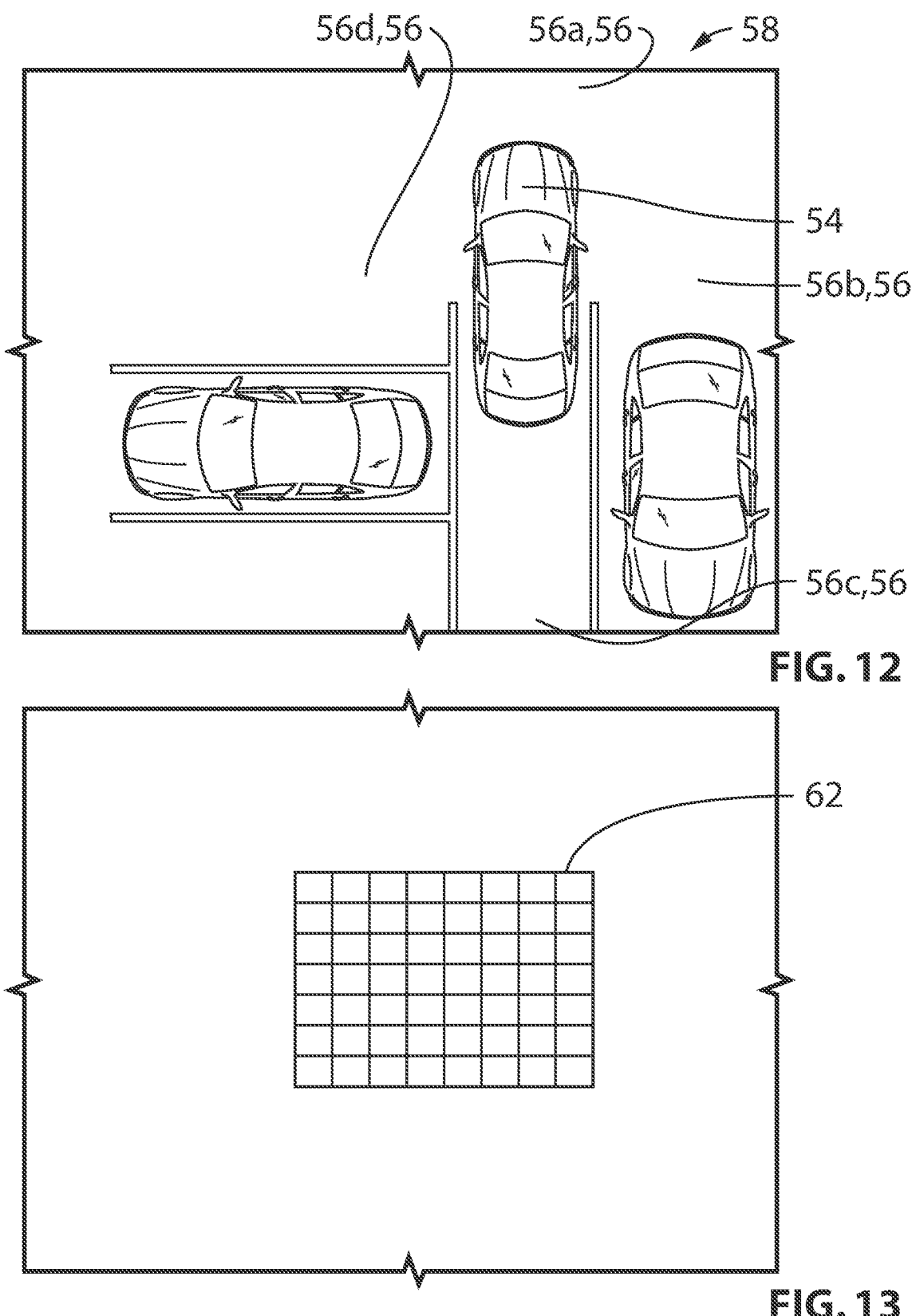
FIG. 12 is an image taken using the vehicle surround view system shown in FIG. 11.
FIG. 13 is an image from the camera shown in FIG. 1, during a procedure to align the lens and imager.

Another application of the camera 10 that combines the features of overlays and the bird's eye viewing mode is in a 360 degree view system, an example of which is shown at 50 in FIG. 11. The 360 degree view system 50 includes four cameras 10, including a front camera 10a, a rear camera 10b, a driver's side camera 10c and a passenger side camera 10d, and a central controller 52. Each of the cameras 10a, 10b, 10c and 10d can be operated in a bird's eye viewing mode and can provide images to the central controller 52. The central controller 52 can then put together an image shown in FIG. 12, with a static overlay 54 which would be a representation of a top view of the vehicle along with the four bird's eye views shown at 56 and individually 56a, 56b, 56c and 56d from the four cameras 10 (FIG. 11). The bird's eye views 56a, 56b, 56c and 56d are preferably merged together into a single image 58 without any seam lines where one view 56 mates with another.

Because the cameras 10 are each capable of dewarping the images they receive, and of processing the images to provide a bird's eye view, and of adding graphic overlays on the images, the cameras 10 can be used for all of these functions and the processed images produced by the cameras 10 and be sent to the central controller 52 using inexpensive electrical cables, such as shielded twisted (or untwisted) pair cables, shown schematically in FIG. 11 at 60. These electrical cables 60, in addition to being relatively inexpensive are also relatively flexible, making them easy to route through the vehicle between the cameras 10 and the central controller 52.

By contrast, if such as a system were provided with cameras that were not themselves equipped with sufficiently powerful on-board microcontrollers 18 to carry out the aforementioned functions, the functions would have to be carried out externally, e.g., by the central controller 52. In such a situation, the raw images received by the cameras 10 would have to be sent to the central controller 52 for processing. A relatively great amount of care would need to be taken to ensure that the raw images were transmitted to the central controller 52 in relatively pristine condition, since the processing of the images will result in some degradation of the images. In order to minimize the degradation of the images in their transmission from the cameras to the central controller, the electrical cables and any connectors could be relatively expensive (e.g., coaxial cable). In addition, the electrical cables could be relatively inflexible and difficult to route through the vehicle.

Reference is made to FIG. 1. Because the camera 10 has the capability of applying graphic overlays to the image using the on-board microcontroller 18, the overlays can be aligned to the optical axis of the lens 22 before the camera 10 leaves the assembly facility. The camera 10 may be held in a fixture that is itself positioned at a known position relative to a selected reference pattern, shown at 62 in FIG. 13. When in the fixture, the image received by the camera's imager 16 is sent to an external controller (not shown).

The external controller compares the image received from the camera 10 with the image that would have been received if the center of the imager 16 (FIG. 2) were precisely aligned with the optical axis of the lens 22 (FIG. 1). The offset between the actual and theoretically perfect images indicates the amount of offset present between the optical axis of the lens 22 and the center of the imager 16. This offset provides the camera 10 with an offset value to apply to certain types of overlays when they are provided on the image, such as the static overlay 36 shown in FIG. 8, the dynamic overlay 38 shown in FIG. 9, and the dynamic overlay 40 shown in FIG. 10. By aligning the overlay to the optical axis of the lens 22, a source of error in the positioning of the overlays is eliminated.

Figure 14:
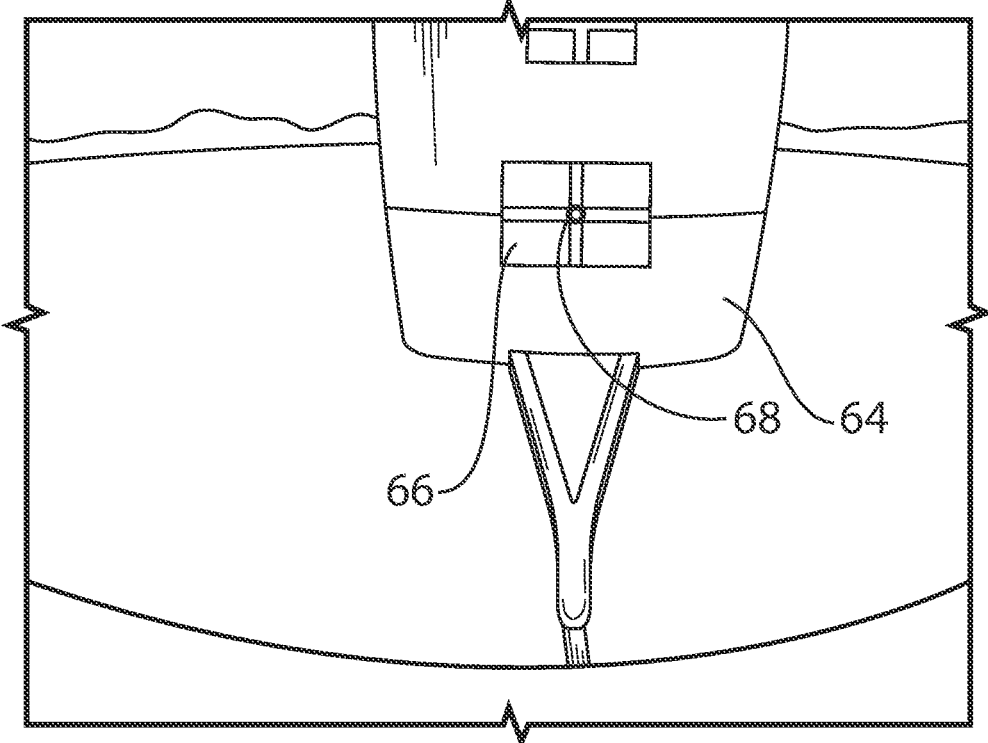
FIG. 14 is an image from the camera shown in FIG. 1 when the camera is in a trailer mode.

Reference is made to FIG. 14, which shows a trailer 64 with a target shown at 66. The microcontroller 18 is capable of identifying selected target shapes in images received on the imager 16. In the embodiment shown in FIG. 14, the target is a cross. With the trailer 64 positioned directly behind the vehicle (i.e., at a zero angle relative to the vehicle), the driver 10 can instruct the camera 10 to enter a 'trailer' mode, wherein the microcontroller 18 finds the center of the target 66. Once found, the microcontroller 18 applies an overlay shown at 68 to the image of the target 66. The overlay 68 may be a spot that appears at the center of the target 66. As the driver backs up the vehicle, the target 66 will shift in the image transmitted from the camera 10 to the in-vehicle display, but the overlay 68 is held in a fixed position, and thus the driver will see an offset between the overlay 68 and the center of the target 66 depending on the angle between the trailer 64 and the vehicle. By steering the vehicle so that the overlay 68 remains at the center of the target 66, the driver can back the vehicle up keeping the trailer 64 and the vehicle aligned. It will be understood that the overlay 68 need not be a dot and need not be at the center of the target 66. The system will be useful even if the overlay 68 is near the target 66 but not covering the target 66. Thus, the overlay 68 can be used if it is proximate the target 66 (i.e., sufficiently close to the target 66 or covering some or all of the target 66 that relative movement between the target 66 and the overlay 68 is noticeable by the driver of the vehicle).

Figure 15:
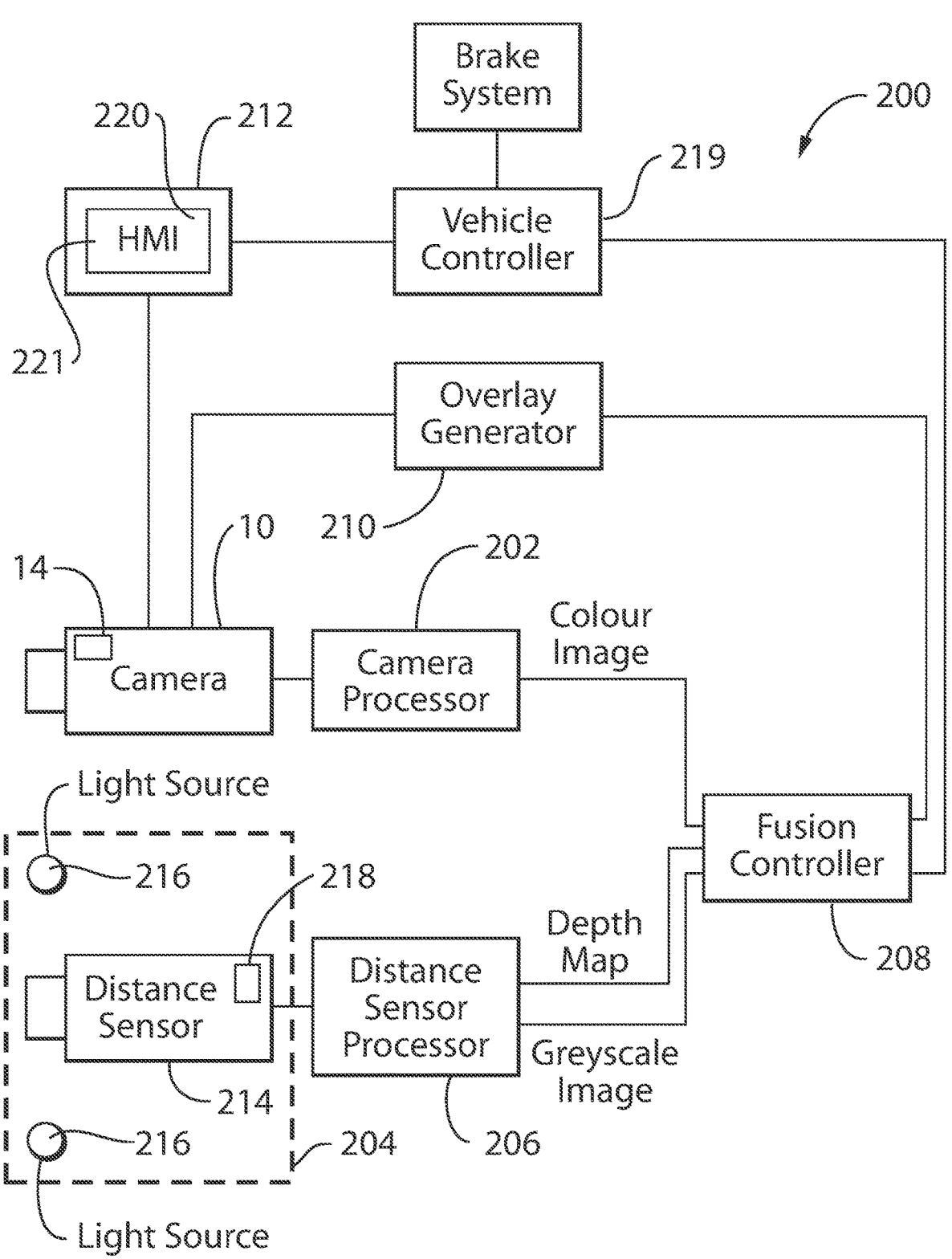
FIG. 15 is a schematic illustration of a camera system that is used for object detection using the camera shown in FIG. 1.

Reference is made to FIG. 15, which shows a schematic illustration of a camera system 200 that provides obstacle detection to the driver of the vehicle. The camera system 200 includes the camera 10, a camera processor 202, a distance sensor system 204, a distance sensor processor 206, a fusion controller 208, an overlay generator 210 and a Human/ Machine Interface (HMI) 212. The camera 10 as described receives a first image on the imager 14 (FIG. 1). The first image has a first resolution that depends on the resolution of the imager 14. For a typical application, the resolution is preferably 640×480 pixels. The first image itself does not contain any explicit distance information regarding the distances of objects behind the vehicle, however, the camera processor 202 is configured to process the first image to detect objects of interest in the first image (e.g., people, animals, other vehicles) and to determine whether such objects of interest represent a collision risk.

The distance sensor system 204 preferably includes an infrared time-of-flight sensor 214 (which may be referred to as a TOF sensor) and a plurality of light sources 216. The light sources 216 emit modulated light, which reflects off any objects behind the vehicle. The reflected light is received by an imager 218 that is part of the TOF sensor 214. The image that is formed on the imager 218 is a greyscale image, which may be referred to as a second image. The second image has a second image resolution that depends on the resolution of the imager 218. In a typical application, the second image resolution will be lower than the resolution of the first image with the camera 10. The first and second images may be processed by the fusion controller 208 to generate a stereo image, which provides the fusion controller 208 with depth information relating to objects in the two images. The fusion controller 208 uses the depth information to determine if any objects behind the vehicle represent a collision risk, in which case the fusion controller 208 determines what action, if any, to take. One action that can be taken is for the fusion controller 208 to send a signal to a vehicle control system (shown at 219) to apply the parking brake, or the regular vehicle brakes or to prevent their release. Additionally, the fusion controller 208 communicates with the overlay generator 210 to apply an overlay on the image warning the driver of the object or objects that represent a collision risk. The overlay could, for example be a box around any such objects in the image. The overlay generator 210 may communicate the overlay information back to the camera 10, which then sends the image with the overlay to the in-vehicle display, shown at 220, which makes up part of the HMI 212. The rest of the HMI may be made up of a touch screen input 221 that is superimposed on the display 220. In order to override the system 200 and release the applied brake, the driver can interact with the HMI 212 to press a selected on-screen button to indicate to the system 200 that the objects have been seen and the driver does not feel that they represent a collision risk, at which time the system 200 can release the applied brake. In addition to the overlay, the driver of the vehicle can be notified of a collision risk by way of sound (e.g., a chime, a beep or a voice message) or by way of tactile feedback, such as by vibration of the steering wheel or seat.

Additionally, the image received by the imager 218 can be processed by the distance sensor processor 106 to determine the phase shift of the light at each pixel on the imager 218. The phase shift of the light is used to determine the distance of the surface that reflected the light to the TOF sensor 214. Thus, the distance sensor processor 206 can generate a depth map relating to the image. Optionally, the distance sensor processor 206 processes the pixels in groups and not individually. For example, the processor 206 may obtain average phase shift data from groups of 2×2 pixels. Thus, the depth map has a third resolution that is lower than the second image resolution.

The depth map is sent to the fusion controller 208, which can interpret it to determine if any objects shown therein represent a collision risk. The fusion controller 208 preferably works with both the depth map and the camera image to improve the determination of whether detected objects are collision risks. For example, the fusion controller 208 may determine from the depth map, that there is an object that is within 2 meters from the vehicle towards the lower central portion of the depth map. However, the fusion controller 208 may determine from the camera processor 202 that the object in that region is a speed bump, in which case the fusion controller 208 may determine that this does not represent a collision risk and so the system 200 would not warn the driver, and would not apply the brake.

In different situations, the fusion controller 208 gives greater weight to the information from either the depth map or the camera image. For example, for objects that are farther than 3 meters away, the fusion controller 208 gives greater weight to information from the camera 10 and the camera processor 202. For objects that are closer than 3 meters (or some other selected distance) away, the fusion controller 208 gives greater weight to information from the distance sensor 204 and the distance sensor processor 206.

The camera processor 202 is configured to recognize certain types of object in the images it receives from the camera 10, such as an adult, a child sitting, a toddler, a vehicle, a speed bump, a child on a bicycle, tall grass, fog (e.g., fog from a sewer grating or a manhole, or fog from the exhaust of the vehicle itself). In some situations, the fusion controller 208 determines whether there is movement towards the vehicle by any objected in the images it receives. In some situations, when the fusion controller 208 determines from the depth map that an object is too close to the vehicle, it uses information from the camera processor 202 to determine what the object is. This assists the fusion controller 208 in determine whether the object is something to warn the driver about (e.g., a child, or a tree), or if it is something to be ignored (e.g., exhaust smoke from the vehicle itself, or a speed bump). Additionally, this information can also be used by the overlay generator 210 to determine the size and shape of the overlay to apply to the image. It will be understood that some of the elements recognized by the camera processor 202 belong to a category containing objects of interest, such as the adult, the child sitting, the toddler, the vehicle and the child on the bicycle. Other elements recognized by the camera processor 202 may belong to a category of elements that do not represent a collision risk, such as, a speed bump, tall grass and fog.

After the TOF sensor 214 and the camera 10 are installed on the vehicle, a calibration procedure is preferably carried out. The calibration procedure includes displaying an image with high contrast elements on it, at a selected distance from the vehicle, at a selected position vertically and laterally relative to the vehicle. The image can be for example, a white rectangle immediately horizontally adjacent a black rectangle. The fusion controller 208 determines the relative positions of the mating line between the two rectangles on the two imagers 16 and 218. During use of the camera system 200 this information is used by the fusion controller 208 to determine the distances of other objects viewed by the camera 10 and the TOF sensor 214. The calibration procedure could alternatively be carried out using a checkerboard pattern of four or more rectangles so that there are vertical and horizontal mating lines between rectangles.

Throughout this disclosure the term imager and image processor have been used. These terms both indicate a device that includes an image sensor and some control elements. The microcontroller and the portion of the imager including the control elements together make up a 'controller' for the camera. It will be understood that in some embodiments, and for some purposes the control of the camera need not be split into the control elements in the imager and the microcontroller that is external to the imager. It will be understood that the term 'controller' is intended to include any device or group of devices that control the camera.

While the above description constitutes a plurality of embodiments of the present invention, it will be appreciated that the present invention is susceptible to further modification and change without departing from the fair meaning of the accompanying claims.

The invention claimed is:

1. A vehicular vision system, the vehicular vision system comprising:

a rear backup camera comprising a lens and a CMOS image sensor, wherein the rear backup camera is disposed at a rear portion of a vehicle equipped with the vehicular vision system and has a field of view rearward of the vehicle;

an image processor, wherein image data captured by the rear backup camera is processed at the image processor;

a video display screen disposed in the vehicle and viewable by a driver of the vehicle;

wherein, during a reversing maneuver of the vehicle, the rear backup camera captures raw image data and the vehicular vision system determines position of a selected feature in the field of view of the rear backup camera and applies an overlay at the selected feature in the raw image data captured by the rear backup camera to produce an initial processed image;

wherein, during the reversing maneuver of the vehicle, the vehicular vision system modifies raw image data captured by the rear backup camera to produce processed images;

wherein, during the reversing maneuver of the vehicle, video images derived from the processed images are displayed at the video display screen;

wherein, during the reversing maneuver of the vehicle, the vehicular vision system holds the overlay in a fixed position at the video display screen from when the video display screen displays the initial processed image to when the video display screen displays subsequent processed images so that the overlay does not move at the video display screen from display of the initial processed image to display of subsequent processed images and movement of the selected feature within the field of view of the rear backup camera is displayed as movement of the selected feature relative to the overlay at the video display screen;

wherein the vehicular vision system is operable in at least (i) a standard viewing mode and (ii) a cross-traffic viewing mode;

wherein, with the vehicular vision system operating in the standard viewing mode, image data captured by the rear backup camera is processed at the image processor to provide video images derived from the processed captured image data that are representative of a standard view rearward of the vehicle that is within the field of view of the rear backup camera; and wherein, with the vehicular vision system operating in the cross-traffic viewing mode, image data captured by the rear backup camera is processed at the image processor to provide video images derived from the processed captured image data that are representative of a wider angle view rearward of the vehicle that is within the field of view of the rear backup camera and that has a wider angle view than the standard view rearward of the vehicle.

2. The vehicular vision system as claimed in claim 1, wherein processing at the image processor reduces distortion in the video images provided to the video display screen.

3. The vehicular vision system as claimed in claim 2, wherein the vehicular vision system, when operating in the standard viewing mode, utilizes digital distortion correction.

4. The vehicular vision system as claimed in claim 2, wherein the vehicular vision system, when operating in the cross-traffic viewing mode, utilizes digital distortion correction.

5. The vehicular vision system as claimed in claim 1, wherein, with the vehicular vision system operating in the cross-traffic viewing mode, the displayed video images provide the driver of the vehicle with a 180 degree view.

6. The vehicular vision system as claimed in claim 5, wherein, with the vehicular vision system operating in the standard viewing mode, the displayed video images provide the driver of the vehicle with at least a 135 degree view.

7. The vehicular vision system as claimed in claim 1, wherein the vehicular vision system is operable in a bird's eye viewing mode, and wherein, with the vehicular vision system operating in the bird's eye viewing mode, image data captured by the rear backup camera is processed at the image processor to provide video images derived from the processed captured image data that are representative of a bird's eye view.

8. The vehicular vision system as claimed in claim 7, wherein, with the vehicular vision system operating in the bird's eye viewing mode, a portion of captured image data is compressed and another portion of captured image data is stretched so that a viewing angle of the bird's eye view is more vertically oriented than a viewing angle of the standard view.

9. The vehicular vision system as claimed in claim 1, wherein the vehicle has a towing hitch, and wherein the towing hitch is in the field of view of the rear backup camera, and wherein the vehicular vision system operates in a hitch viewing mode in which the towing hitch in the displayed video images is magnified to a magnification level that is greater than a magnification level provided in the standard viewing mode.

10. The vehicular vision system as claimed in claim 1, wherein the vehicular vision system, via processing at the image processor of image data captured by the rear backup camera, determines a projected trajectory for the vehicle, and wherein the vehicular vision system applies a projected path overlay at the displayed video images, and wherein the projected path overlay comprises a representation of the projected trajectory.

11. The vehicular vision system as claimed in claim 1, wherein the selected feature is a feature on a trailer being towed by the vehicle.

12. The vehicular vision system as claimed in claim 1, wherein the vehicular vision system, via processing at the image processor of image data captured by the rear backup camera, detects an object present rearward of the vehicle and in the field of view of the rear backup camera.

13. The vehicular vision system as claimed in claim 12, wherein the displayed video images include images of the detected object.

14. The vehicular vision system as claimed in claim 13, wherein the video display screen displays an overlay that highlights the displayed detected object.

15. The vehicular vision system as claimed in claim 12, wherein the vehicular vision system, via processing at the image processor of image data captured by the rear backup camera, and responsive at least in part to distance to the detected object, determines that the detected object represents a collision risk.

16. The vehicular vision system as claimed in claim 15, wherein, responsive to determination that the detected object represents the collision risk, the vehicular vision system alerts a driver of the vehicle of the collision risk.

17. The vehicular vision system as claimed in claim 15, wherein, responsive to determination that the detected object represents the collision risk, the vehicular vision system controls at least one vehicle component to mitigate collision by the vehicle with the detected object.

18. The vehicular vision system as claimed in claim 17, wherein, responsive to determination that the detected object represents the collision risk, the vehicular vision system controls braking of the vehicle.

19. The vehicular vision system as claimed in claim 15, wherein, prior to determining whether the detected object represents a collision risk, the vehicular vision system determines whether the detected object falls within a category of objects that do not represent a collision risk based at least in part on processing of image data captured by the rear backup camera.

20. The vehicular vision system as claimed in claim 15, wherein, prior to determining whether the detected object represents a collision risk, the vehicular vision system determines whether the detected object falls within a category of objects that represent objects of interest based at least in part on processing of image data captured by the rear backup camera.

21. The vehicular vision system as claimed in claim 20, wherein the category of objects that represent objects of interest include at least one selected from the group consisting of people, animals and other vehicles.

22. The vehicular vision system as claimed in claim 12, wherein the vehicular vision system determines distance to the detected object.

23. The vehicular vision system as claimed in claim 22, wherein the vehicular vision system determines distance to the detected object via a distance sensor disposed at the vehicle and having a field of sensing rearward of the vehicle.

24. The vehicular vision system as claimed in claim 23, wherein the distance sensor comprises a plurality of infrared light-emitting light sources, and wherein the distance sensor senses infrared light.

25. A vehicular vision system, the vehicular vision system comprising:

a rear backup camera comprising a lens and a CMOS image sensor, wherein the rear backup camera is disposed at a rear portion of a vehicle equipped with the vehicular vision system and has a field of view rearward of the vehicle;

an image processor, wherein image data captured by the rear backup camera is processed at the image processor;

a video display screen disposed in the vehicle and viewable by a driver of the vehicle;

wherein, during a reversing maneuver of the vehicle, the rear backup camera captures raw image data and the vehicular vision system determines position of a selected feature in the field of view of the rear backup camera and applies an overlay at on-the selected feature in the raw image data captured by the rear backup camera to produce an initial processed image;

wherein, during the reversing maneuver of the vehicle, the vehicular vision system modifies raw image data captured by the rear backup camera to produce processed images;

wherein, during the reversing maneuver of the vehicle, video images derived from the processed images are displayed at the video display screen;

wherein, during the reversing maneuver of the vehicle, the vehicular vision system holds the overlay in a fixed position at the video display screen from when the video display screen displays the initial processed image to when the video display screen displays subsequent processed images so that the overlay does not move at the video display screen from display of the initial processed image to display of subsequent processed images and movement of the selected feature within the field of view of the rear backup camera is displayed as movement of the selected feature relative to the overlay at the video display screen;

wherein processing at the image processor reduces distortion in the video images provided to the video display screen;

wherein the vehicular vision system is operable in at least (i) a standard viewing mode, (ii) a cross-traffic viewing mode and (iii) a bird's eye viewing mode;

wherein, with the vehicular vision system operating in the standard viewing mode, image data captured by the rear backup camera is processed at the image processor to provide video images derived from the processed captured image data that are representative of a standard view rearward of the vehicle that is within the field of view of the rear backup camera;

wherein, with the vehicular vision system operating in the cross-traffic viewing mode, image data captured by the rear backup camera is processed at the image processor to provide video images derived from the processed captured image data that are representative of a wider angle view rearward of the vehicle that is within the field of view of the rear backup camera and that has a wider angle view than the standard view rearward of the vehicle; and wherein, with the vehicular vision system operating in the bird's eye viewing mode, image data captured by the rear backup camera is processed at the image processor to provide video images derived from the processed captured image data that are representative of a bird's eye view.

26. The vehicular vision system as claimed in claim 25, wherein the vehicular vision system, when operating in the standard viewing mode, utilizes digital distortion correction.

27. The vehicular vision system as claimed in claim 25, wherein the vehicular vision system, when operating in the cross-traffic viewing mode, utilizes digital distortion correction.

28. The vehicular vision system as claimed in claim 25, wherein, with the vehicular vision system operating in the cross-traffic viewing mode, the displayed video images provide the driver of the vehicle with a 180 degree view.

29. The vehicular vision system as claimed in claim 28, wherein, with the vehicular vision system operating in the standard viewing mode, the displayed video images provide the driver of the vehicle with at least a 135 degree view.

30. The vehicular vision system as claimed in claim 25, wherein, with the vehicular vision system operating in the bird's eye viewing mode, a portion of captured image data is compressed and another portion of captured image data is stretched so that a viewing angle of the bird's eye view is more vertically oriented than a viewing angle of the standard view.

31. The vehicular vision system as claimed in claim 25, wherein the vehicle has a towing hitch, and wherein the towing hitch is in the field of view of the rear backup camera, and wherein the vehicular vision system operates in a hitch viewing mode in which the towing hitch in the displayed video images is magnified to a magnification level that is greater than a magnification level provided in the bird's eye viewing mode.

32. The vehicular vision system as claimed in claim 25, wherein the vehicular vision system, via processing at the image processor of image data captured by the rear backup camera, determines a projected trajectory for the vehicle, and wherein the vehicular vision system applies a projected path overlay at the displayed video images, and wherein the projected path overlay comprises a representation of the projected trajectory.

33. The vehicular vision system as claimed in claim 25, wherein the vehicular vision system, via processing at the image processor of image data captured by the rear backup camera, detects an object present rearward of the vehicle and in the field of view of the rear backup camera.

34. The vehicular vision system as claimed in claim 33, wherein the displayed video images include images of the detected object.

35. The vehicular vision system as claimed in claim 34, wherein the video display screen displays an overlay that highlights the displayed detected object.

36. The vehicular vision system as claimed in claim 33, wherein the vehicular vision system, via processing at the image processor of image data captured by the rear backup camera, and responsive at least in part to distance to the detected object, determines that the detected object represents a collision risk.

37. The vehicular vision system as claimed in claim 36, wherein, responsive to determination that the detected object represents the collision risk, the vehicular vision system alerts a driver of the vehicle of the collision risk.

38. The vehicular vision system as claimed in claim 36, wherein, responsive to determination that the detected object represents the collision risk, the vehicular vision system controls at least one vehicle component to mitigate collision by the vehicle with the detected object.

39. The vehicular vision system as claimed in claim 36, wherein, responsive to determination that the detected object represents the collision risk, the vehicular vision system controls braking of the vehicle to mitigate collision by the vehicle with the detected object.

40. A vehicular vision system, the vehicular vision system comprising:

a rear backup camera comprising a lens and a CMOS image sensor, wherein the rear backup camera is disposed at a rear portion of a vehicle equipped with the vehicular vision system and has a field of view rearward of the vehicle;

an image processor, wherein image data captured by the rear backup camera is processed at the image processor;

a video display screen disposed in the vehicle and viewable by a driver of the vehicle;

wherein, during a reversing maneuver of the vehicle, the rear backup camera captures raw image data and the vehicular vision system determines position of a selected feature in the field of view of the rear backup camera and applies an overlay at on-the selected feature in the raw image data captured by the rear backup camera to produce an initial processed image;

wherein, during the reversing maneuver of the vehicle, the vehicular vision system modifies raw image data captured by the rear backup camera to produce processed images;

wherein, during the reversing maneuver of the vehicle, video images derived from the processed images are displayed at the video display screen;

wherein, during the reversing maneuver of the vehicle, the vehicular vision system holds the overlay in a fixed position at the video display screen from when the video display screen displays the initial processed image to when the video display screen displays subsequent processed images so that the overlay does not move at the video display screen from display of the initial processed image to display of subsequent processed images and movement of the selected feature within the field of view of the rear backup camera is displayed as movement of the selected feature relative to the overlay at the video display screen;

wherein the vehicular vision system is operable in at least (i) a standard viewing mode and (ii) a cross-traffic viewing mode;

wherein, with the vehicular vision system operating in the standard viewing mode, image data captured by the rear backup camera is processed at the image processor to provide video images derived from the processed captured image data that are representative of a standard view rearward of the vehicle that is within the field of view of the rear backup camera;

wherein the vehicular vision system, when operating in the standard viewing mode, utilizes digital distortion correction to reduce distortion in the video images provided to the video display screen;

wherein, with the vehicular vision system operating in the cross-traffic viewing mode, image data captured by the rear backup camera is processed at the image processor to provide video images derived from the processed captured image data that are representative of a wider angle view rearward of the vehicle that is within the field of view of the rear backup camera and that has a wider angle view than the standard view rearward of the vehicle;

wherein the vehicular vision system, when operating in the cross-traffic viewing mode, utilizes digital distortion correction to reduce distortion in the video images provided to the video display screen;

wherein the vehicular vision system, via processing at the image processor of image data captured by the rear backup camera, detects an object present rearward of the vehicle and in the field of view of the rear backup camera; and wherein the displayed video images include images of the detected object.

41. The vehicular vision system as claimed in claim 40, wherein, with the vehicular vision system operating in the cross-traffic viewing mode, the displayed video images provide the driver of the vehicle with a 180 degree view.

42. The vehicular vision system as claimed in claim 41, wherein, with the vehicular vision system operating in the standard viewing mode, the displayed video images provide the driver of the vehicle with at least a 135 degree view.

43. The vehicular vision system as claimed in claim 40, wherein the vehicular vision system is operable in a bird's eye viewing mode, and wherein, with the vehicular vision system operating in the bird's eye viewing mode, image data captured by the rear backup camera is processed at the image processor to provide video images derived from the processed captured image data that are representative of a bird's eye view.

44. The vehicular vision system as claimed in claim 43, wherein, with the vehicular vision system operating in the bird's eye viewing mode, a portion of captured image data is compressed and another portion of captured image data is stretched so that a viewing angle of the bird's eye view is more vertically oriented than a viewing angle of the standard view.

45. The vehicular vision system as claimed in claim 40, wherein the vehicle has a towing hitch, and wherein the towing hitch is in the field of view of the rear backup camera, and wherein the vehicular vision system operates in a hitch viewing mode in which the towing hitch in the displayed video images is magnified to a magnification level that is greater than a magnification level provided in the standard viewing mode.

46. The vehicular vision system as claimed in claim 40, wherein the vehicular vision system, via processing at the image processor of image data captured by the rear backup camera, determines a projected trajectory for the vehicle, and wherein the vehicular vision system applies a projected path overlay at the displayed video images, and wherein the projected path overlay comprises a representation of the projected trajectory.

47. The vehicular vision system as claimed in claim 40, wherein the video display screen displays an overlay that highlights the displayed detected object.

48. The vehicular vision system as claimed in claim 40, wherein the vehicular vision system, via processing at the image processor of image data captured by the rear backup camera, and responsive at least in part to distance to the detected object, determines that the detected object represents a collision risk.

49. The vehicular vision system as claimed in claim 48, wherein, responsive to determination that the detected object represents the collision risk, the vehicular vision system alerts a driver of the vehicle of the collision risk.

50. The vehicular vision system as claimed in claim 48, wherein, responsive to determination that the detected object represents the collision risk, the vehicular vision system controls braking of the vehicle to mitigate collision by the vehicle with the detected object.

* * * * *